United States Patent
Freebury et al.

(10) Patent No.: US 9,528,264 B2
(45) Date of Patent: Dec. 27, 2016

(54) COLLAPSIBLE ROLL-OUT TRUSS

(71) Applicant: TENDEG LLC, Louisville, CO (US)

(72) Inventors: Gregg E. Freebury, Louisville, CO (US); William H. Francis, Boulder, CO (US)

(73) Assignee: TENDEG LLC, Louisville, CO (US)

( * ) Notice: Subject to any disclaimer, the term of this patent is extended or adjusted under 35 U.S.C. 154(b) by 0 days.

(21) Appl. No.: 14/767,897

(22) PCT Filed: Feb. 14, 2014

(86) PCT No.: PCT/US2014/016605
§ 371 (c)(1),
(2) Date: Aug. 13, 2015

(87) PCT Pub. No.: WO2014/127292
PCT Pub. Date: Aug. 21, 2014

(65) Prior Publication Data
US 2016/0010333 A1    Jan. 14, 2016

Related U.S. Application Data

(60) Provisional application No. 61/765,641, filed on Feb. 15, 2013.

(51) Int. Cl.
*E04C 3/00* (2006.01)
*B64G 99/00* (2009.01)
(Continued)

(52) U.S. Cl.
CPC ............... *E04C 3/005* (2013.01); *B32B 5/26* (2013.01); *B64G 1/222* (2013.01); *B64G 9/00* (2013.01);
(Continued)

(58) Field of Classification Search
CPC ............ E04C 3/005; E04C 3/291; E04C 3/02; E04C 3/36; E04C 3/46; E04C 2003/023; E04C 2003/026; E04C 3/28; B23B 5/26; B64G 1/222; B64G 9/00; B32B 2419/00
See application file for complete search history.

(56) References Cited

U.S. PATENT DOCUMENTS 3,144,104 A    8/1964    Weir et al.
3,144,215 A    8/1964    Klein
(Continued)

FOREIGN PATENT DOCUMENTS

WO    WO 00/64663    11/2000
WO    WO 02/06619    1/2002
(Continued)

OTHER PUBLICATIONS

U.S. Appl. No. 61/952,018, filed Mar. 12, 2014.
(Continued)

*Primary Examiner* — Jeanette E Chapman
(74) *Attorney, Agent, or Firm* — Craig R. Miles; CR Miles P.C.

(57) ABSTRACT

Collapsible support structures and methods of making collapsible support structures which interconvert between a deployed condition and a collapsed planate condition which allows extensible retractable deployment of the collapsed structure from a reduced volume rolled condition.

21 Claims, 32 Drawing Sheets

(51) Int. Cl.
- *B64G 1/22* (2006.01)
- *B32B 5/26* (2006.01)
- *E04C 3/02* (2006.01)
- *E04C 3/28* (2006.01)
- *E04C 3/29* (2006.01)
- *E04C 3/36* (2006.01)
- *E04C 3/46* (2006.01)

(52) U.S. Cl.
CPC . *E04C 3/02* (2013.01); *E04C 3/28* (2013.01); *E04C 3/291* (2013.01); *E04C 3/36* (2013.01); *E04C 3/46* (2013.01); *B32B 2419/00* (2013.01); *E04C 2003/023* (2013.01); *E04C 2003/026* (2013.01)

(56) References Cited

U.S. PATENT DOCUMENTS

| | | | |
|---|---|---|---|
| 3,213,573 A | 10/1965 | Bohr et al. | |
| 3,360,894 A | 1/1968 | Orr et al. | |
| 3,361,377 A | 1/1968 | Trexler | |
| 3,385,397 A | 5/1968 | Robinsky | |
| 3,434,674 A | 3/1969 | Groskopfs | |
| 3,528,543 A | 9/1970 | Robinsky | |
| 3,564,789 A * | 2/1971 | Vyvyan | E04C 3/005 52/108 |
| 3,589,632 A | 6/1971 | Rew | |
| 3,608,844 A | 9/1971 | Tumulty et al. | |
| 3,696,568 A | 10/1972 | Berry | |
| 3,811,633 A | 5/1974 | Cummings et al. | |
| 3,862,528 A | 1/1975 | Meissinger | |
| 3,957,416 A * | 5/1976 | Kaempen | B29C 70/00 156/161 |
| 4,047,339 A | 9/1977 | Smith et al. | |
| 4,796,797 A | 1/1989 | Nakako et al. | |
| 4,991,784 A | 2/1991 | Schmid | |
| 5,088,014 A | 2/1992 | Boughey | |
| 5,235,788 A | 8/1993 | Maimets | |
| 5,348,096 A | 9/1994 | Williams | |
| 5,882,322 A * | 3/1999 | Kim | A61F 5/01 428/174 |
| 6,065,540 A | 5/2000 | Thomeer et al. | |
| 6,131,431 A | 10/2000 | Ona | |
| 6,217,975 B1 | 4/2001 | Daton-Lovett | |
| 6,256,938 B1 | 7/2001 | Daton-Lovett | |
| 6,454,493 B1 | 9/2002 | Lohbeck | |
| 6,602,574 B1 | 8/2003 | Daton-Lovett | |
| 6,904,722 B2 * | 6/2005 | Brown | B64G 1/222 52/108 |
| 6,920,722 B2 | 7/2005 | Brown et al. | |
| 7,251,323 B2 | 7/2007 | Holtorf et al. | |
| 7,617,639 B1 | 11/2009 | Pollard et al. | |
| 7,694,465 B2 * | 4/2010 | Pryor | E04C 3/005 138/119 |
| 7,806,370 B2 * | 10/2010 | Beidleman | B64G 1/222 136/245 |
| 7,895,795 B1 | 3/2011 | Murphey et al. | |
| 8,006,462 B2 | 8/2011 | Murphy et al. | |
| 8,061,660 B2 | 11/2011 | Beidleman et al. | |
| 8,689,514 B1 | 4/2014 | Sternowski | |
| 8,893,442 B1 | 11/2014 | Spence et al. | |
| 2002/0179772 A1 * | 12/2002 | Ohmer | B64C 1/061 244/119 |
| 2007/0006963 A1 | 1/2007 | Bever | |
| 2007/0181241 A1 | 8/2007 | Kramer et al. | |
| 2008/0078139 A1 | 4/2008 | Overby | |
| 2011/0195209 A1 | 8/2011 | Bosman et al. | |
| 2011/0204186 A1 * | 8/2011 | Keller | B64G 1/222 244/172.6 |
| 2011/0308174 A1 | 12/2011 | Meyer | |
| 2012/0297717 A1 | 11/2012 | Keller et al. | |
| 2013/0061541 A1 | 3/2013 | Taylor et al. | |

FOREIGN PATENT DOCUMENTS

| | | |
|---|---|---|
| WO | WO 2014/081943 | 5/2014 |
| WO | WO 2014/127292 | 8/2014 |

OTHER PUBLICATIONS

U.S. Appl. No. 61/729,129, filed Nov. 21, 2012.
International Search Report and Written Opinion for PCT International Patent Application No. PCT/US2013/071266, mailed May 12, 2014, 12 pages total.
U.S. Appl. No. 61/765,641, filed Feb. 15, 2013.
International Search Report and Written Opinion for PCT International Patent Application No. PCT/US2014/016605, mailed Jun. 3, 2014, 13 pages total.
Astro Aerospace Corporation. STEM Design & Performance. Website, http://www.as.northropgrumman.com, originally downloaded Oct. 24, 2012, 9 total pages.
Galletly et al. Bistable composite slit tubes. I. A beam model. International Journal of Solids and Structures, 2004, 41:4517-4533.
Iqbal et al. Bi-Stable Composite Shells. Proc. 41st AIAA Structures, Structural Dynamics, and Materials Conference and Exhibit, Apr. 2000, Atlanta, GA, USA, 8 total pages.
Northrop Grumman. Astro Aerospace: Deployable Structures and Mechanisms for Space Applications.Website, http://www.as.northropgrumman.com,originally downloaded Jun. 12, 2015,4 pgs.
Northrop Grumman. 150-lb Linear Actuator Stem. Website, http://www.as.northropgrumman.com, originally downloaded Oct. 24, 2012, 2 total pages.
Prigent. A Finite Element Model of Bi-Stable Woven Composite Tape-Springs. KTH, Thesis submitted for the Master's degree, Stockholm, Sweden, Oct. 2011.
Rolatube Extending Technology. Rolatube Technology: Product Brochure: Defense and Security. Website, http://www.rolatube.com, originally downloaded Oct. 24, 2012, 20 total pages.
Rolatube Extending Technology. Website, http://www.rolatube.com, originally downloaded Jun. 12, 2015, 2 total pages.
Rolatube Technology Ltd. A Brief Introduction to Bi-Stable Reeled Composites. Website, http://www.rolatube.com, originally downloaded Oct. 24, 2012, 9 total pages.
Straubel, Hillebrandt and Belvin. Results of Research Study: Evaluation of Deployable Space Mast Concepts. Final Presentation, NASA—LaRC, dated Sep. 28, 2011, 54 total pages.
Straubel. Large Deployable Structures. Gossamer Concepts for Versatile Applications. SpacePlan 2020; University of Surrey, Feb. 27, 2014, Guildford, UK; 12 pages total.

* cited by examiner

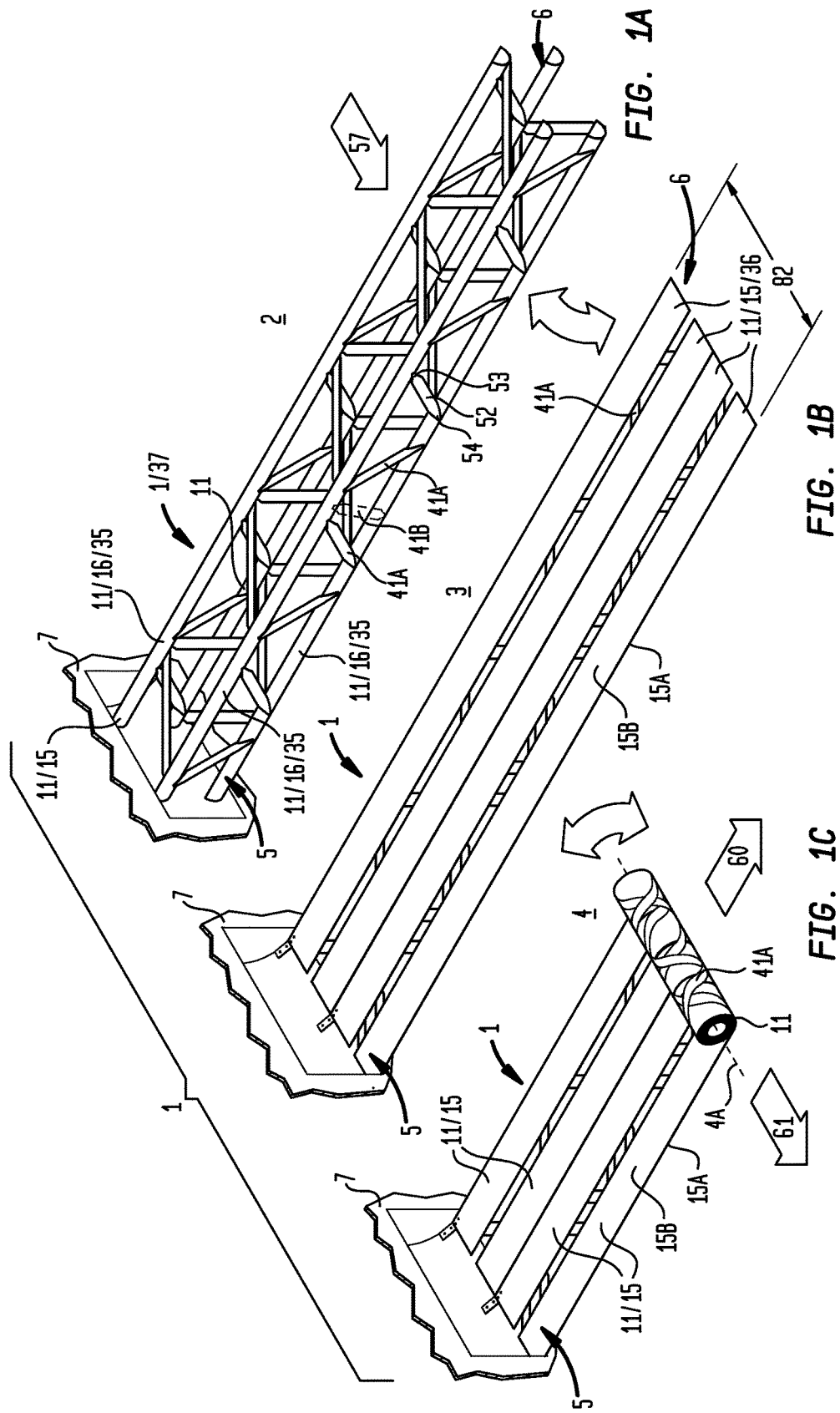

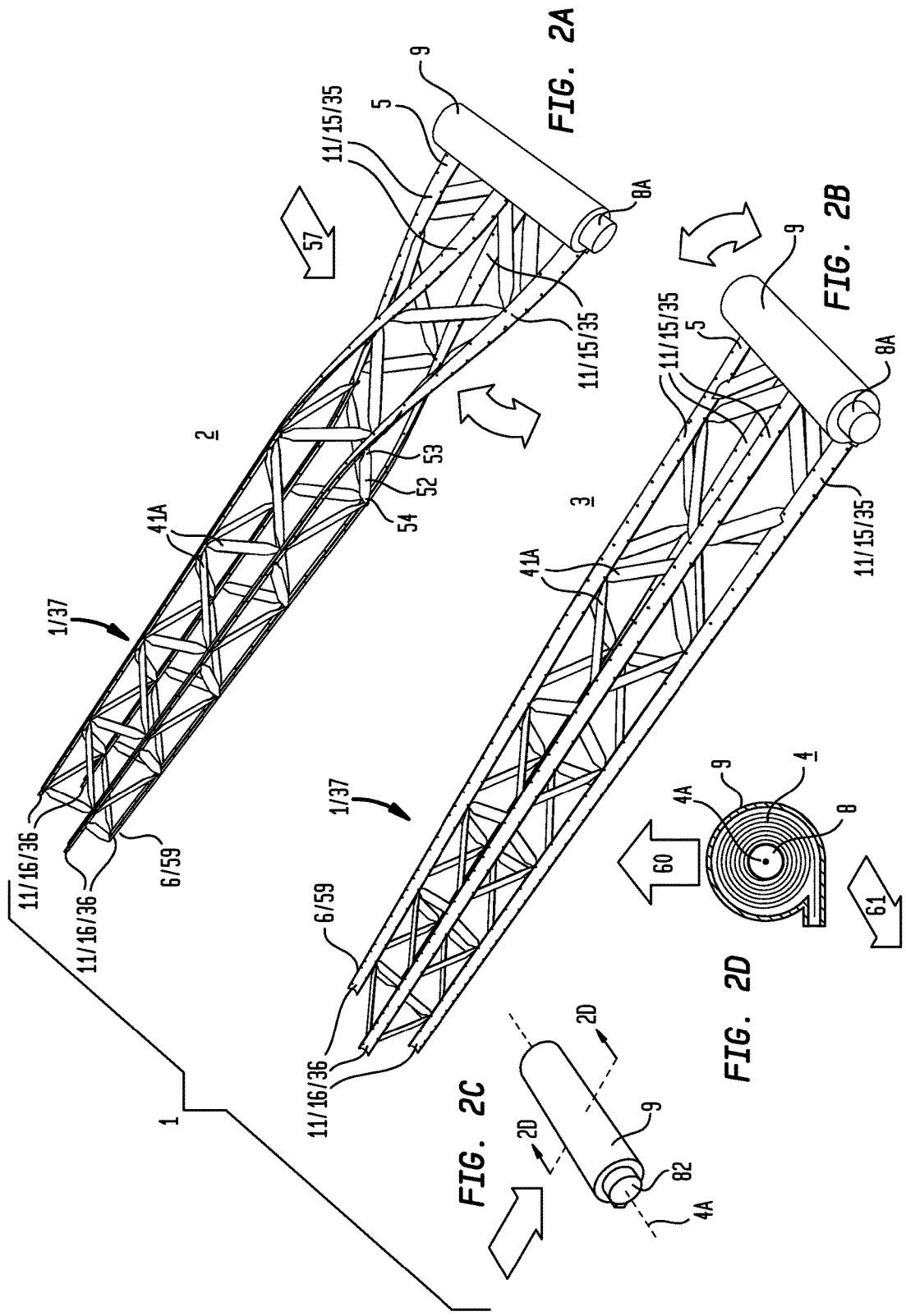

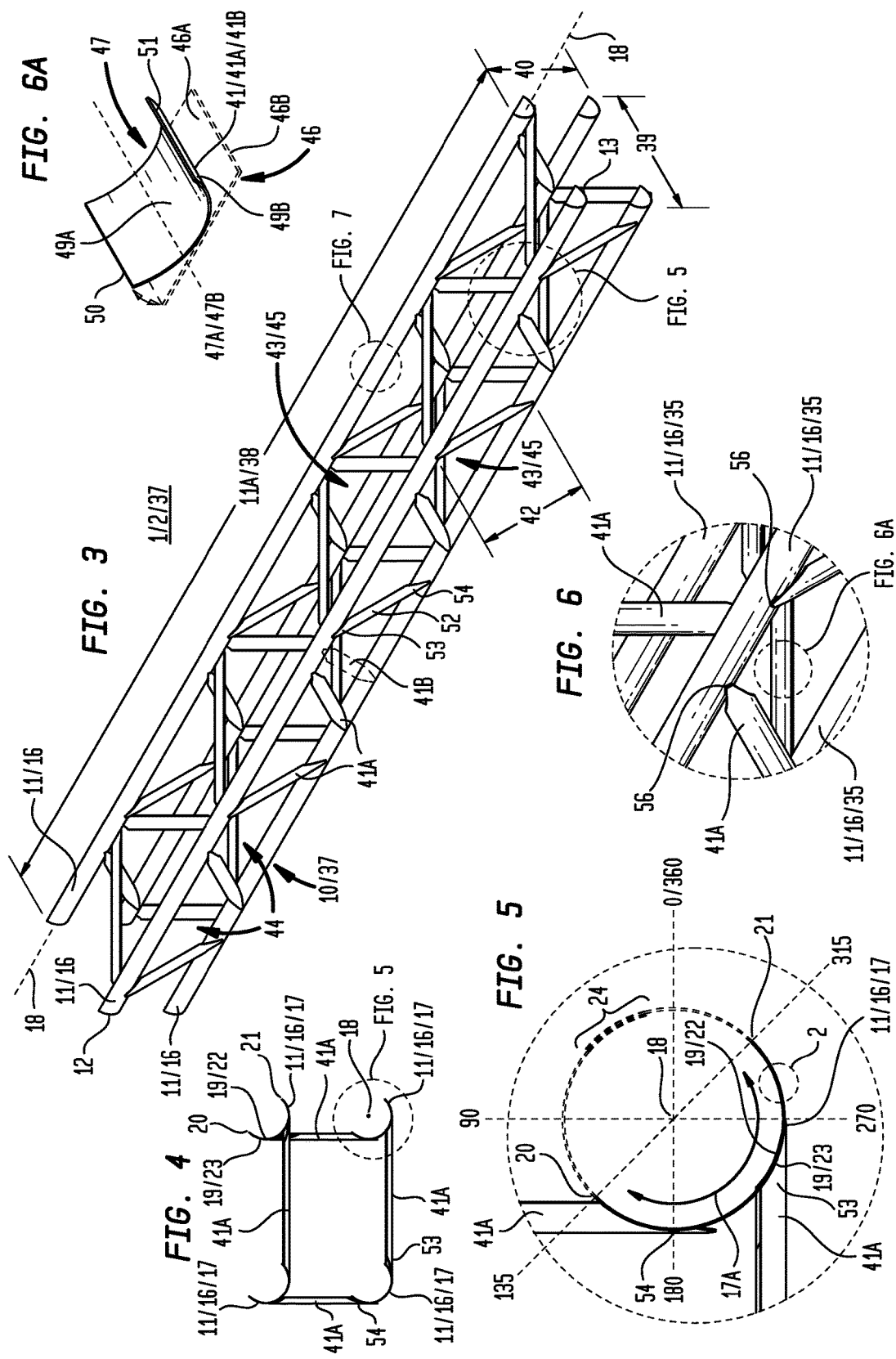

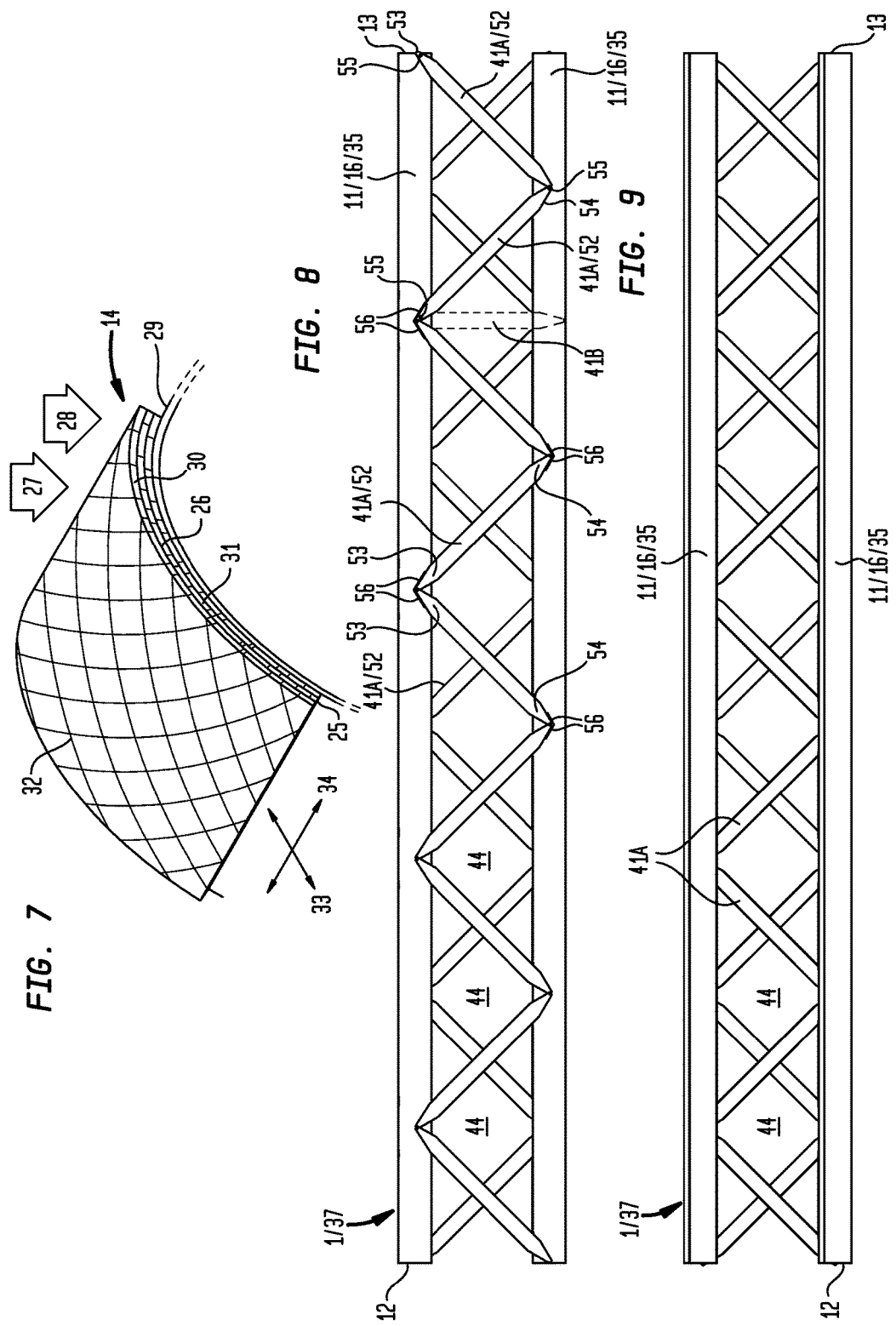

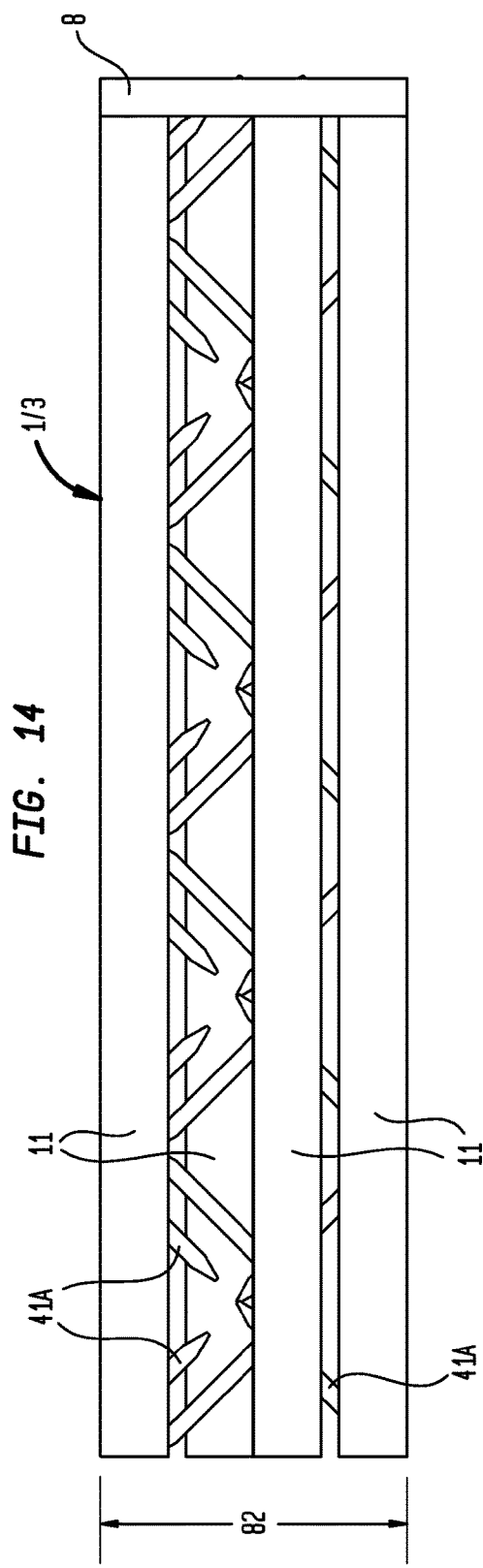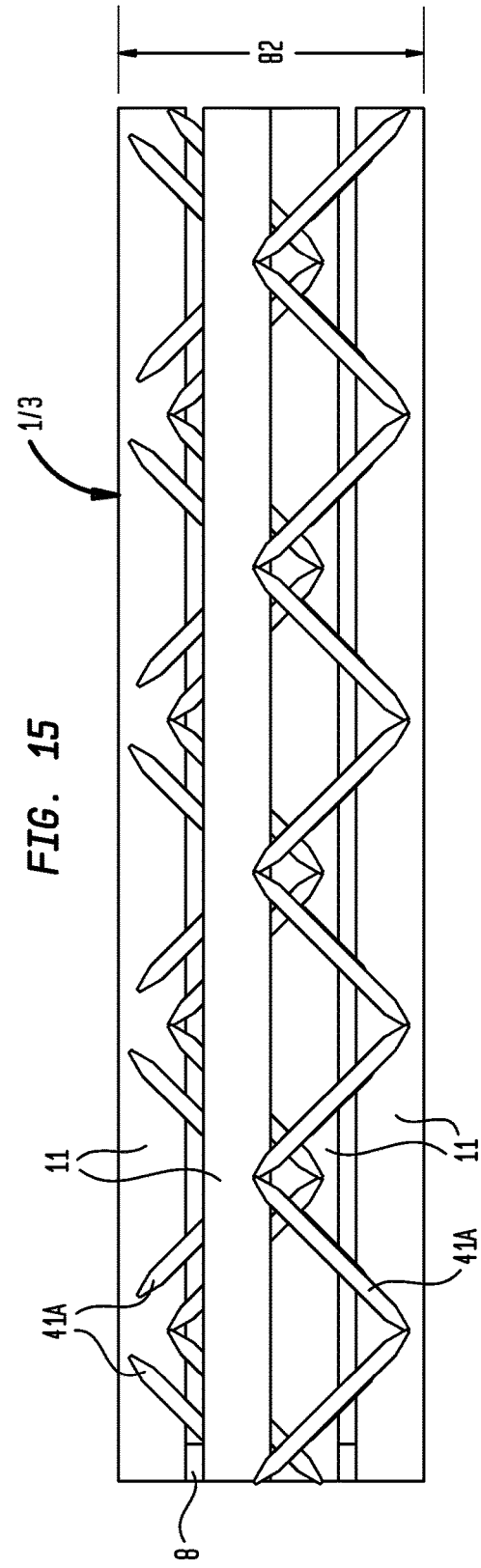

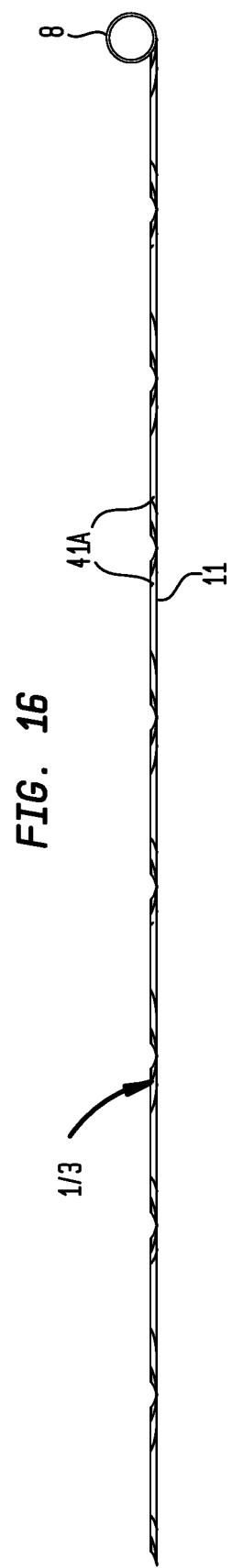

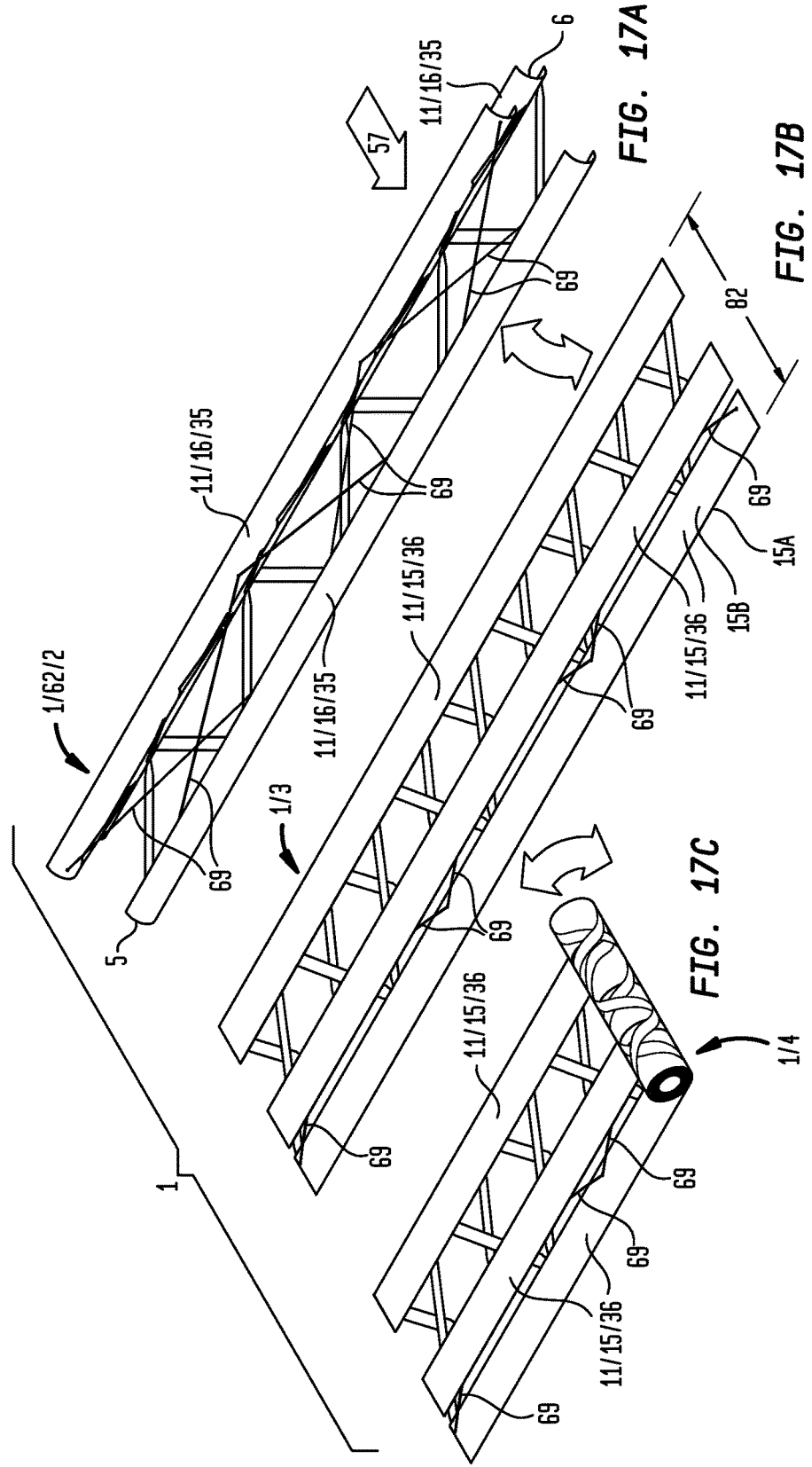

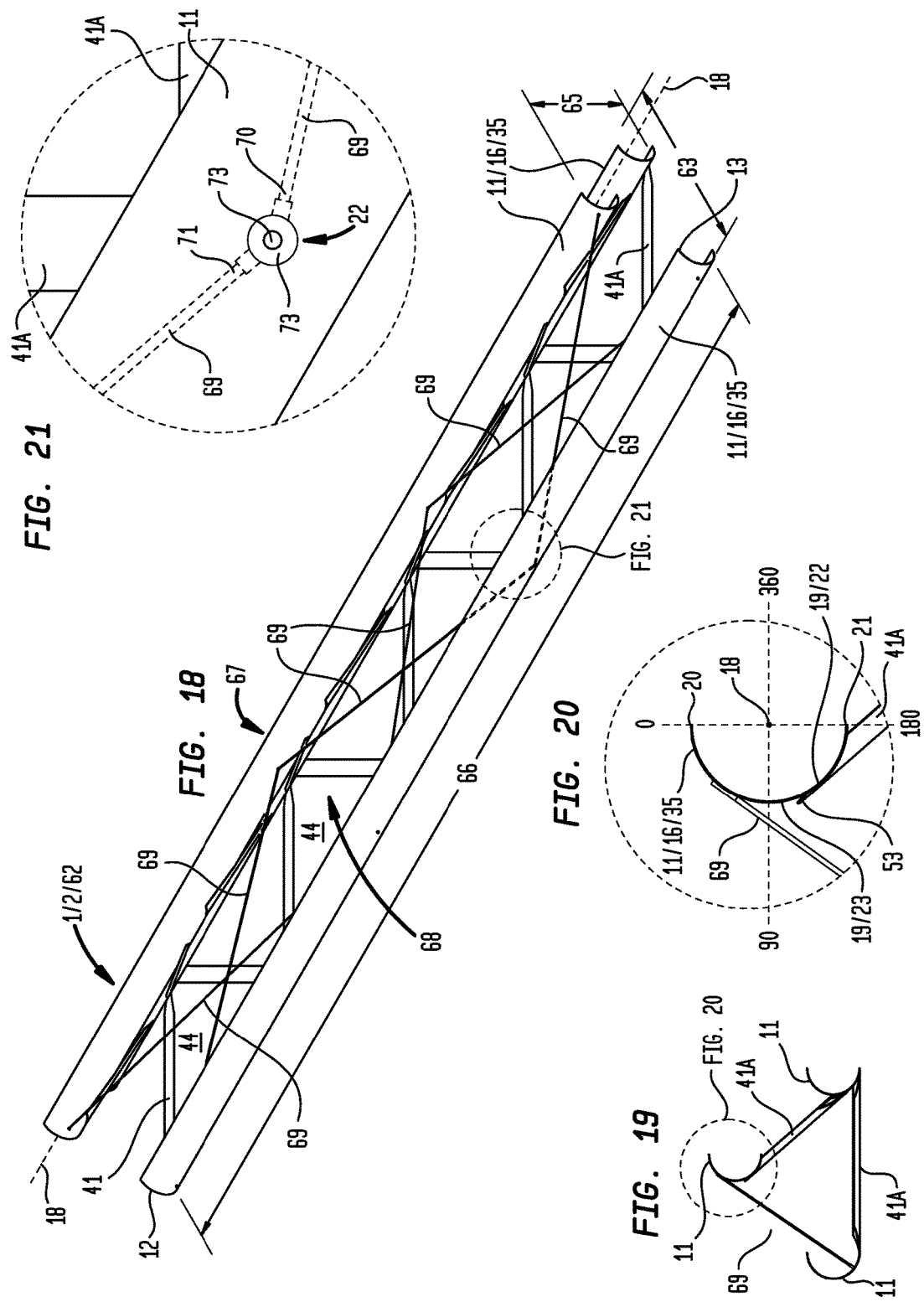

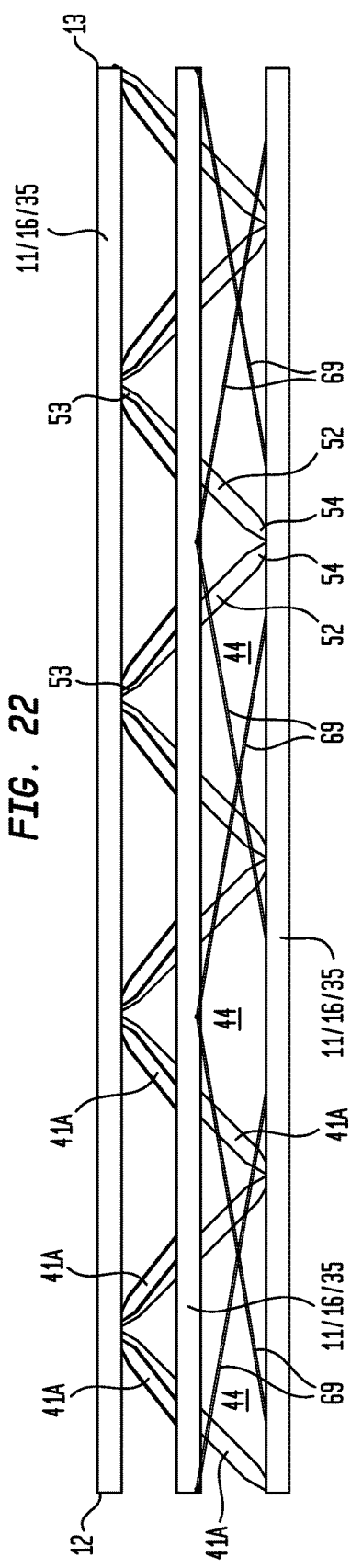
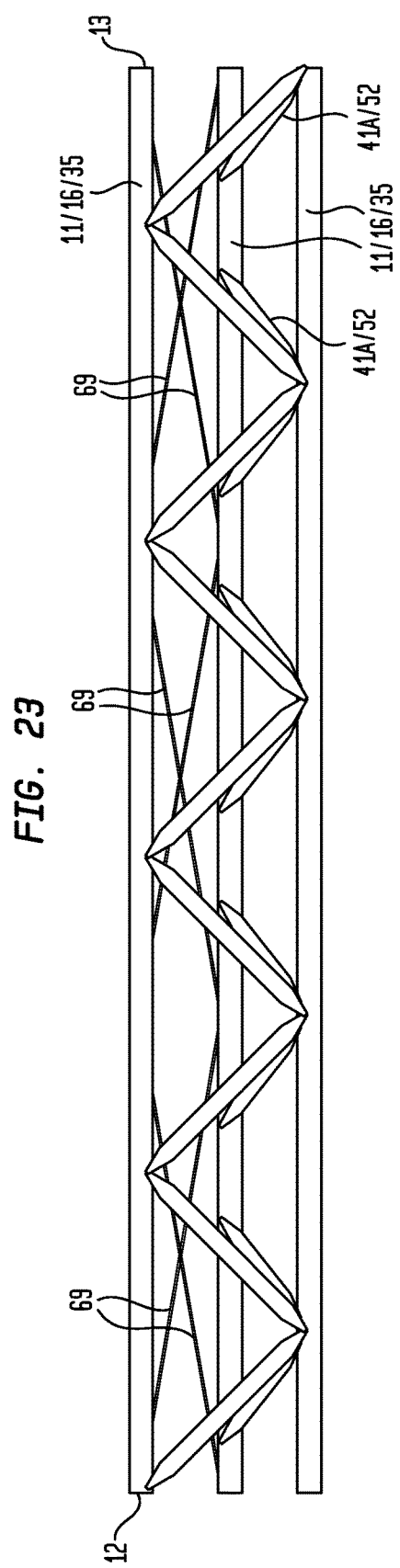
FIG. 22
FIG. 23

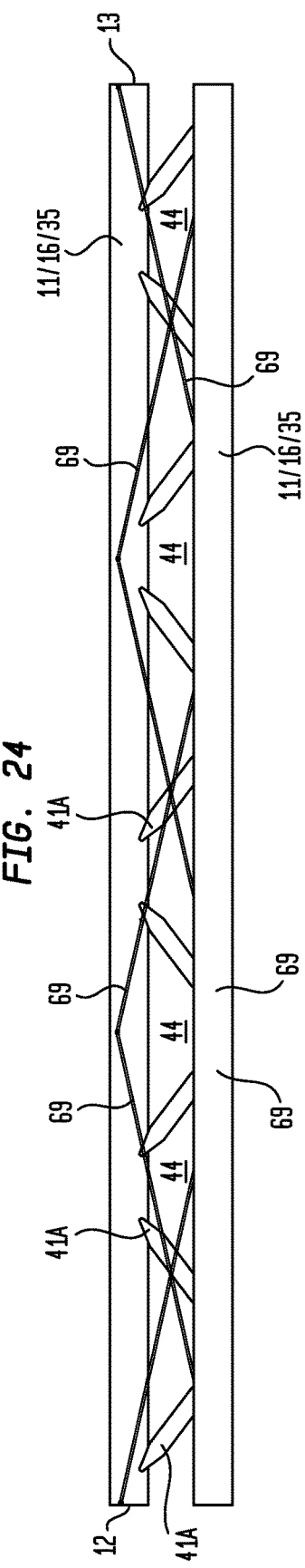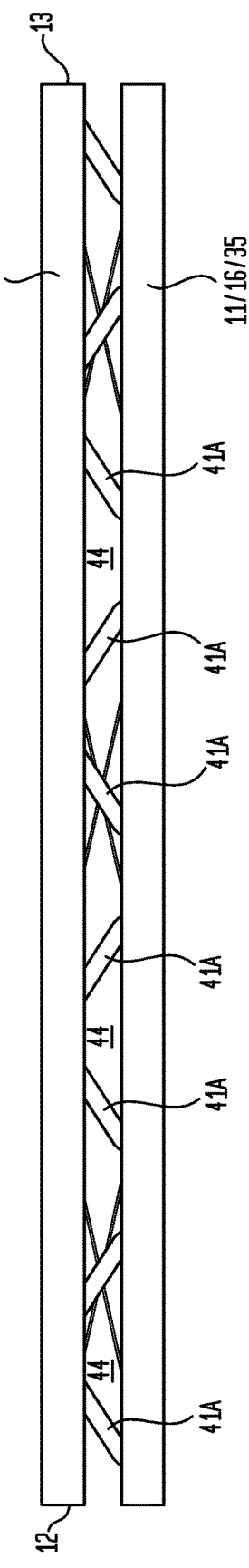

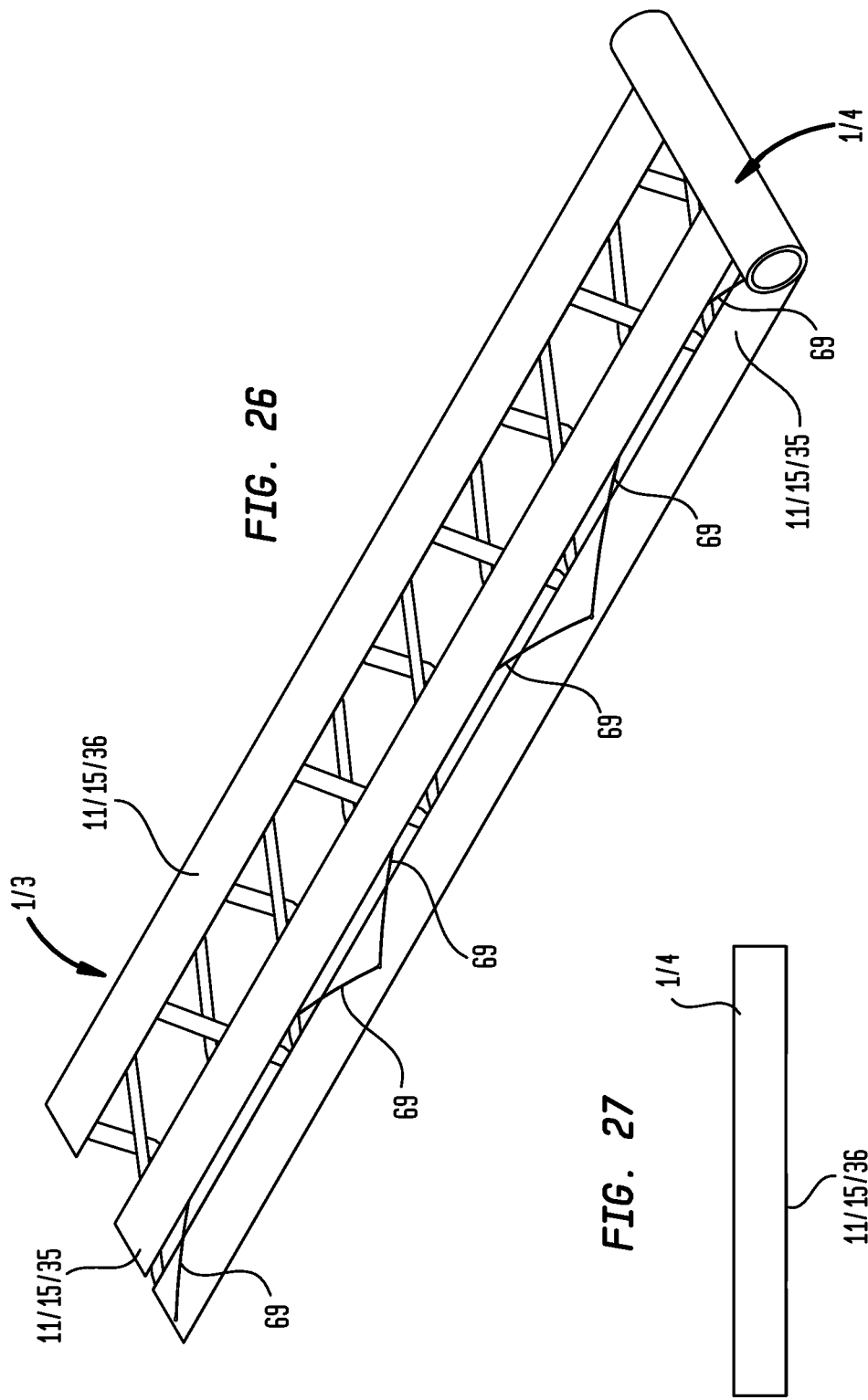

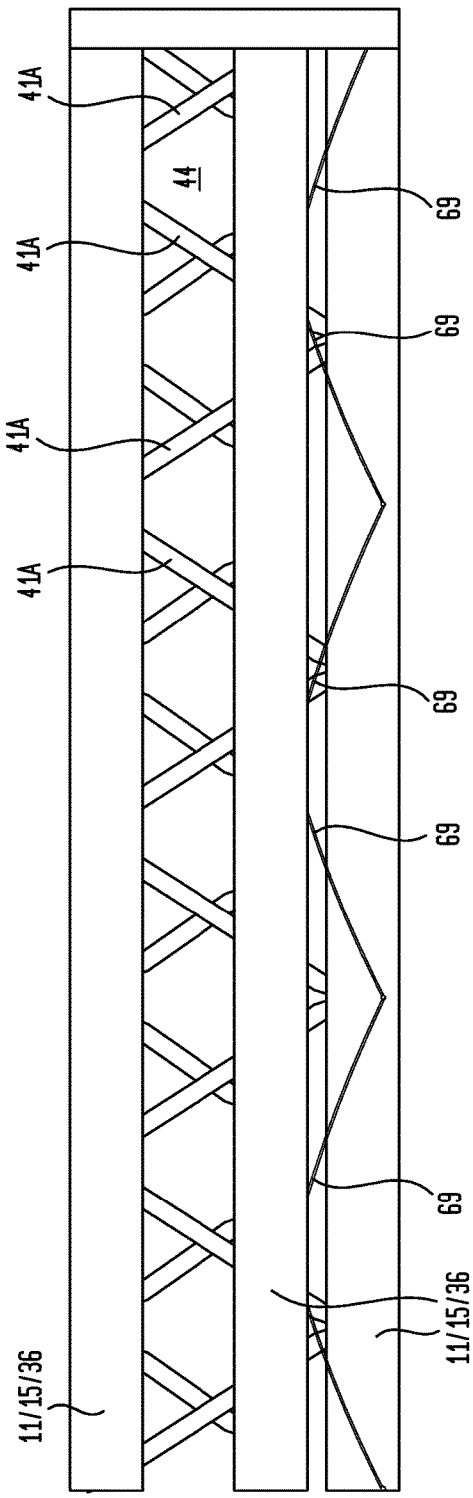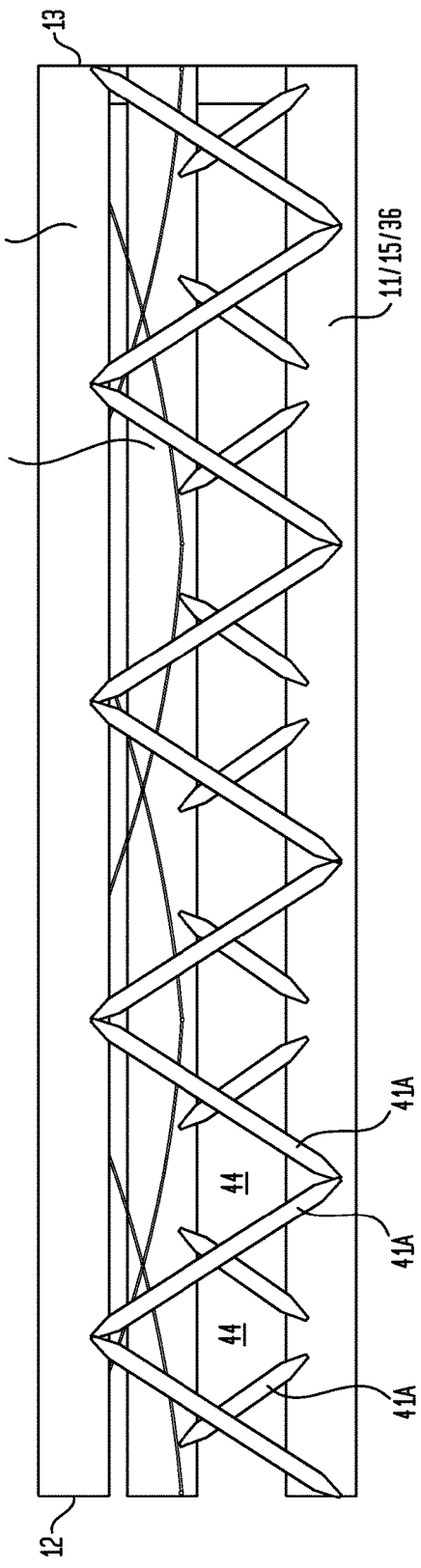

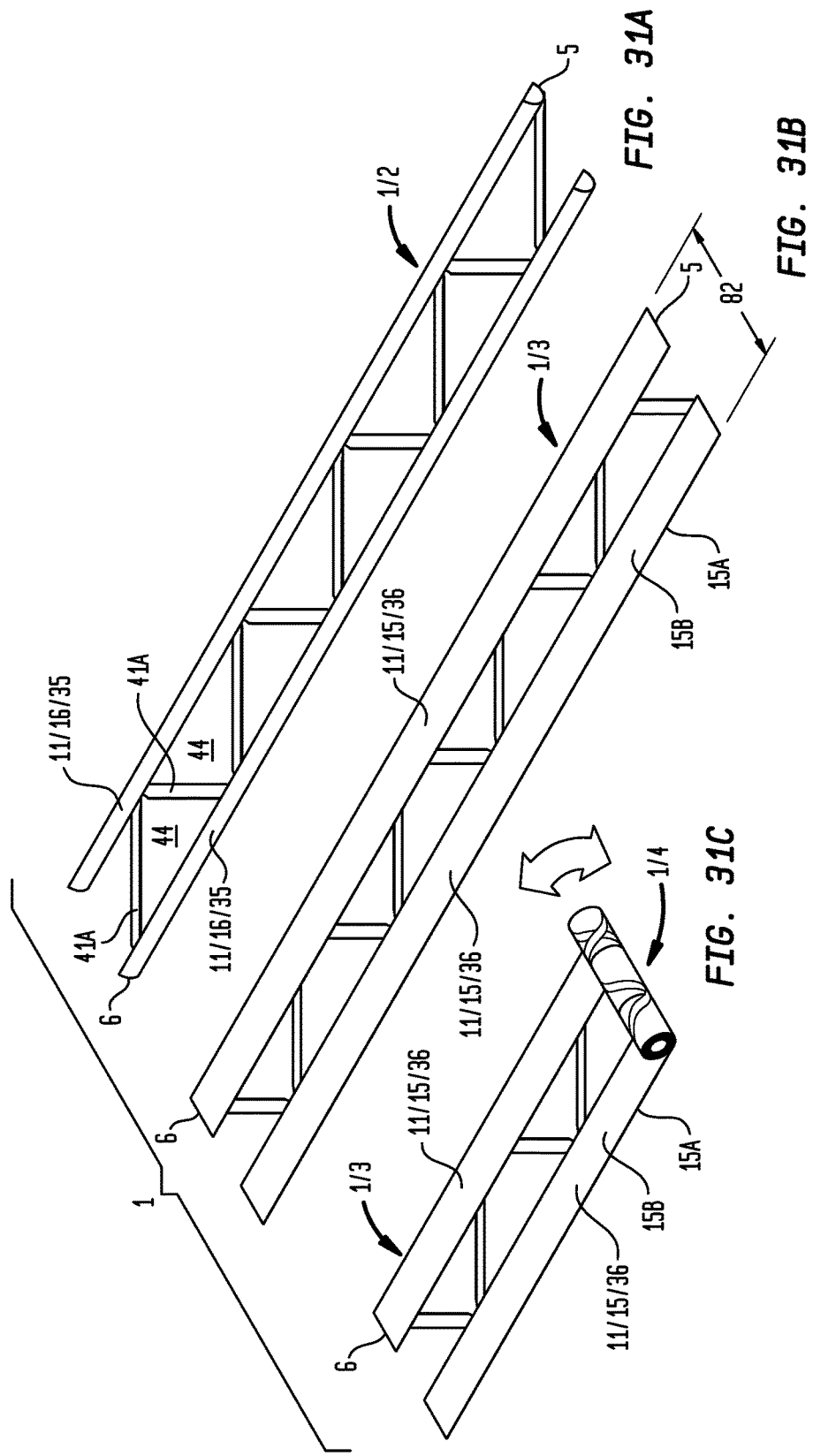

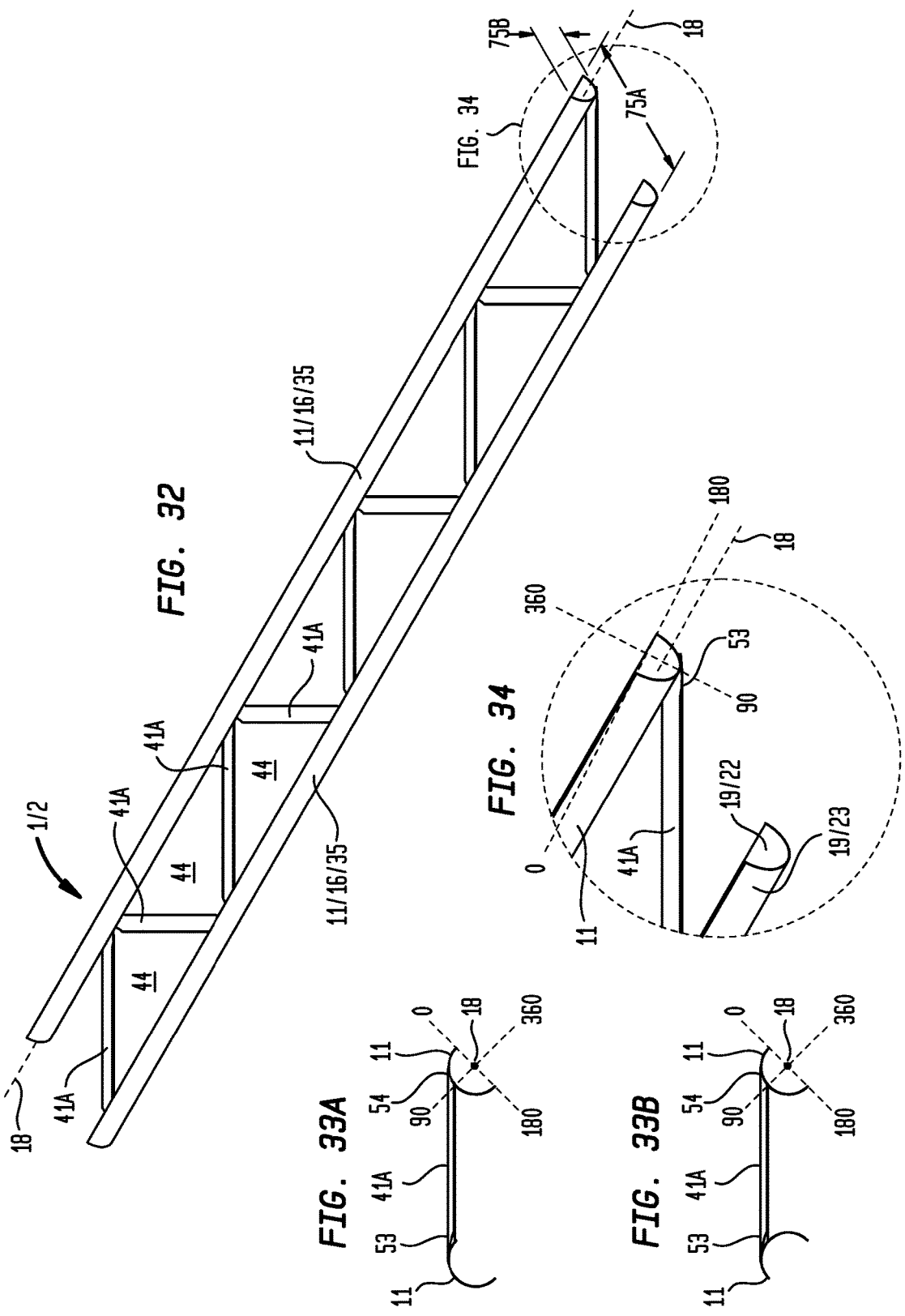

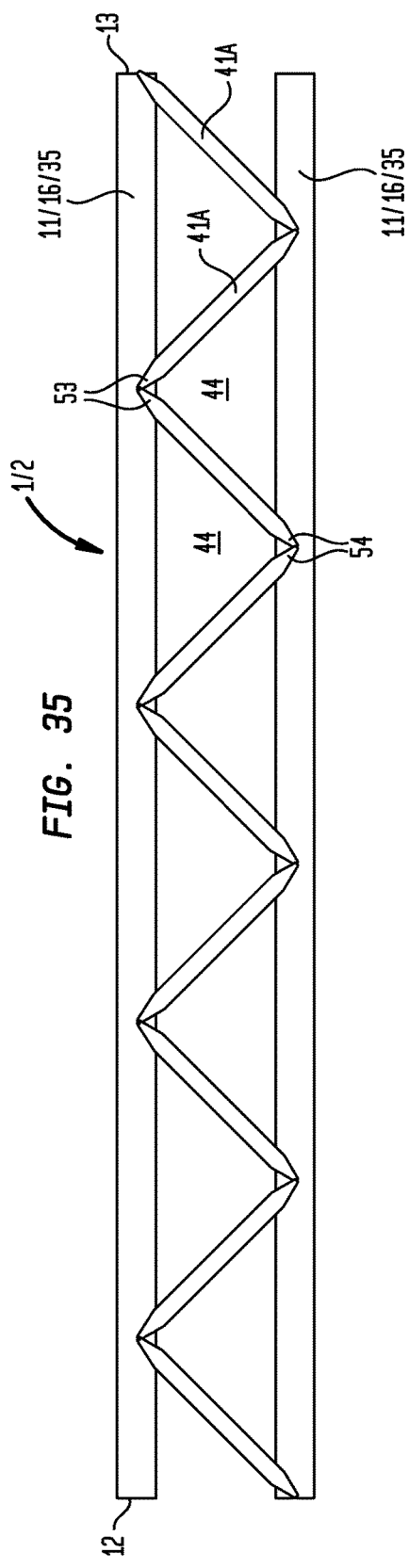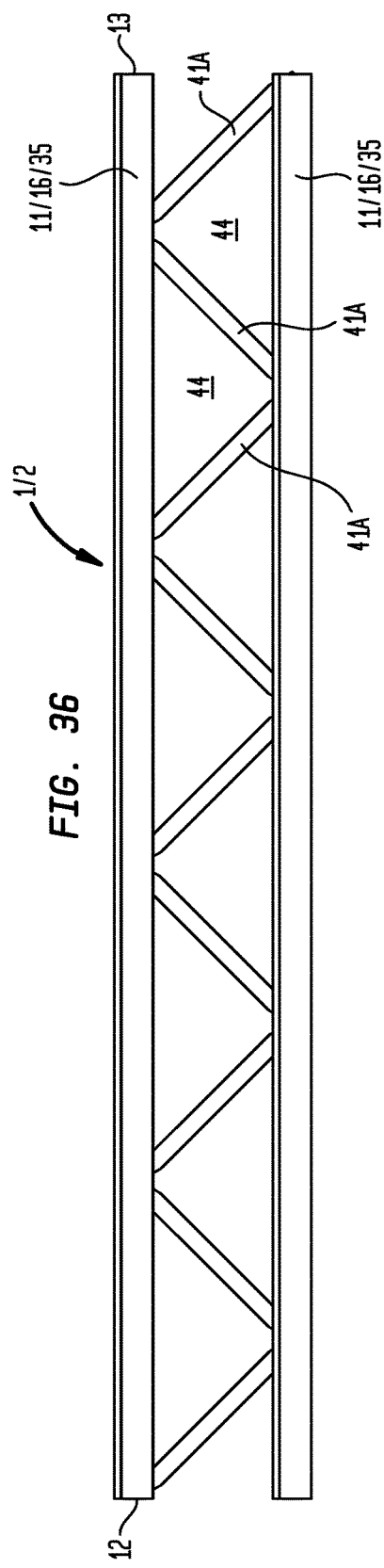

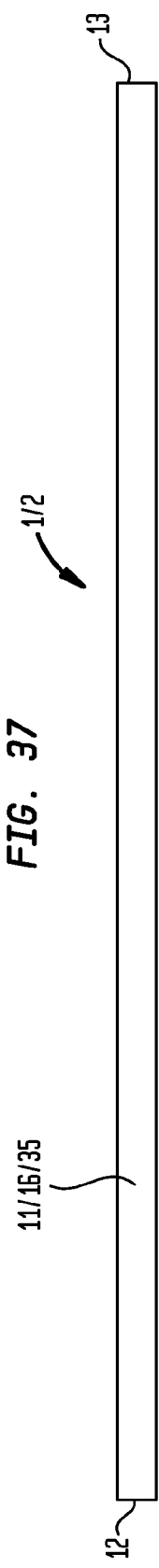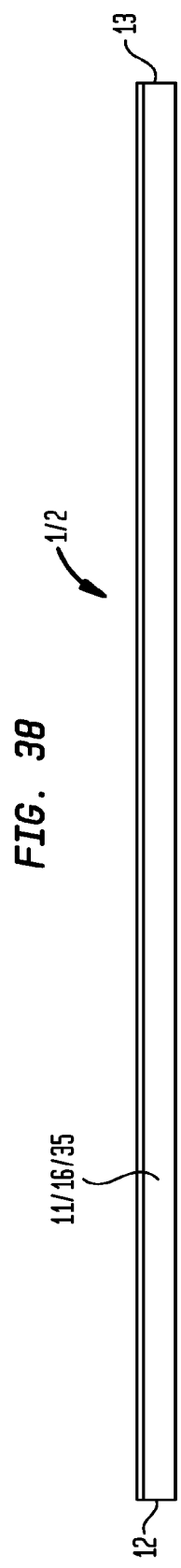

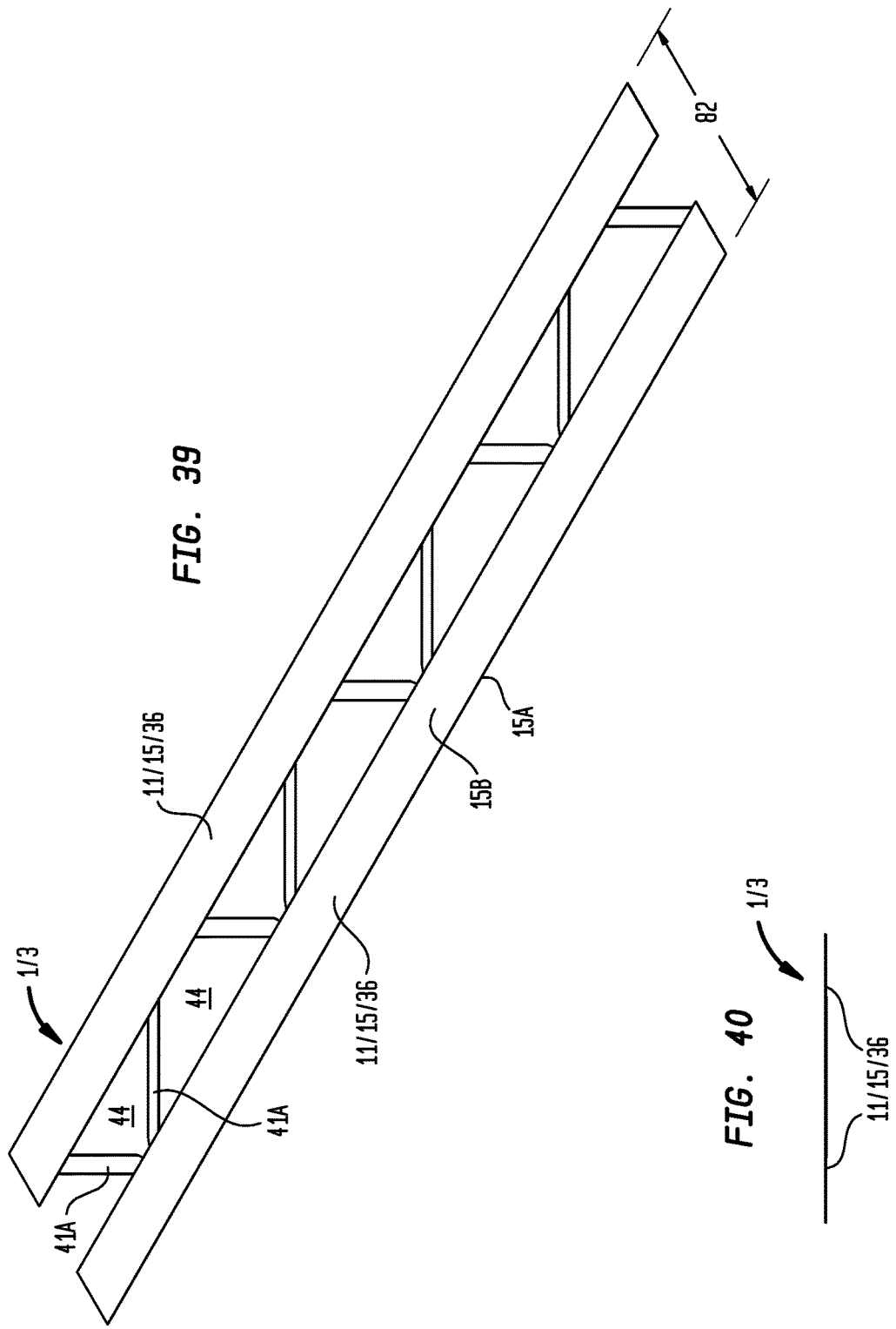

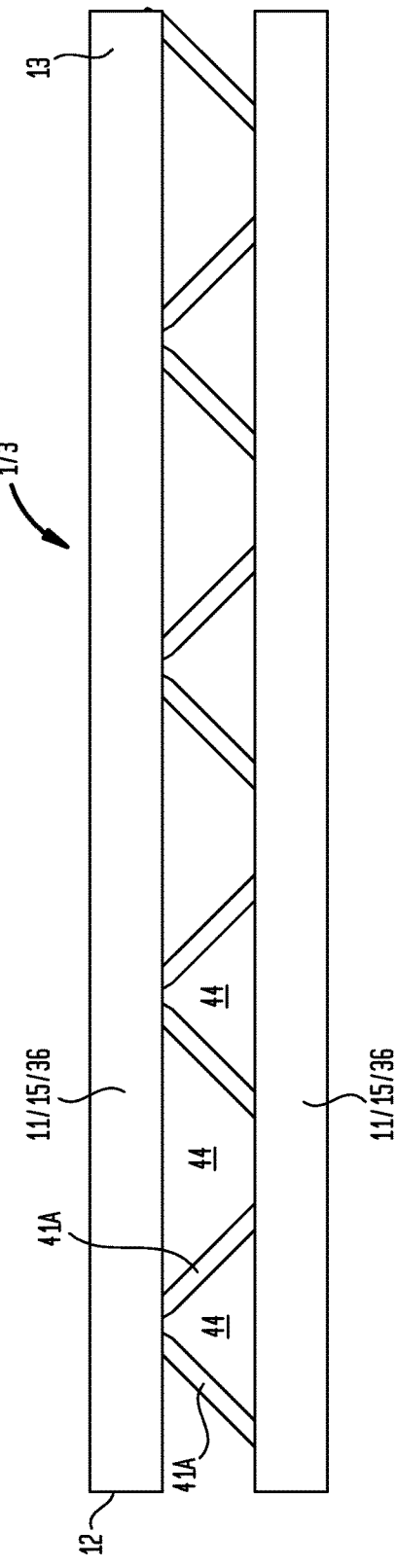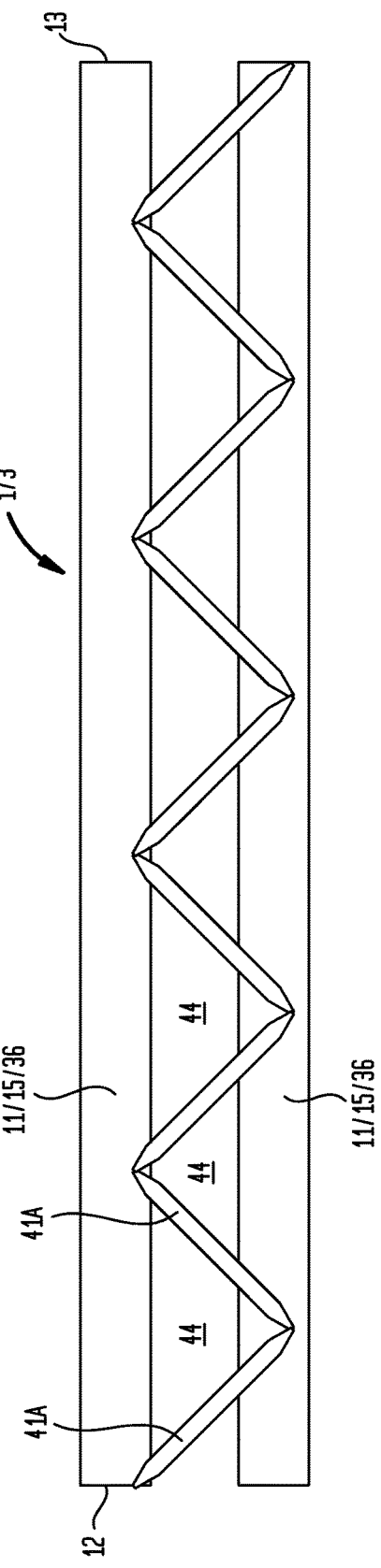

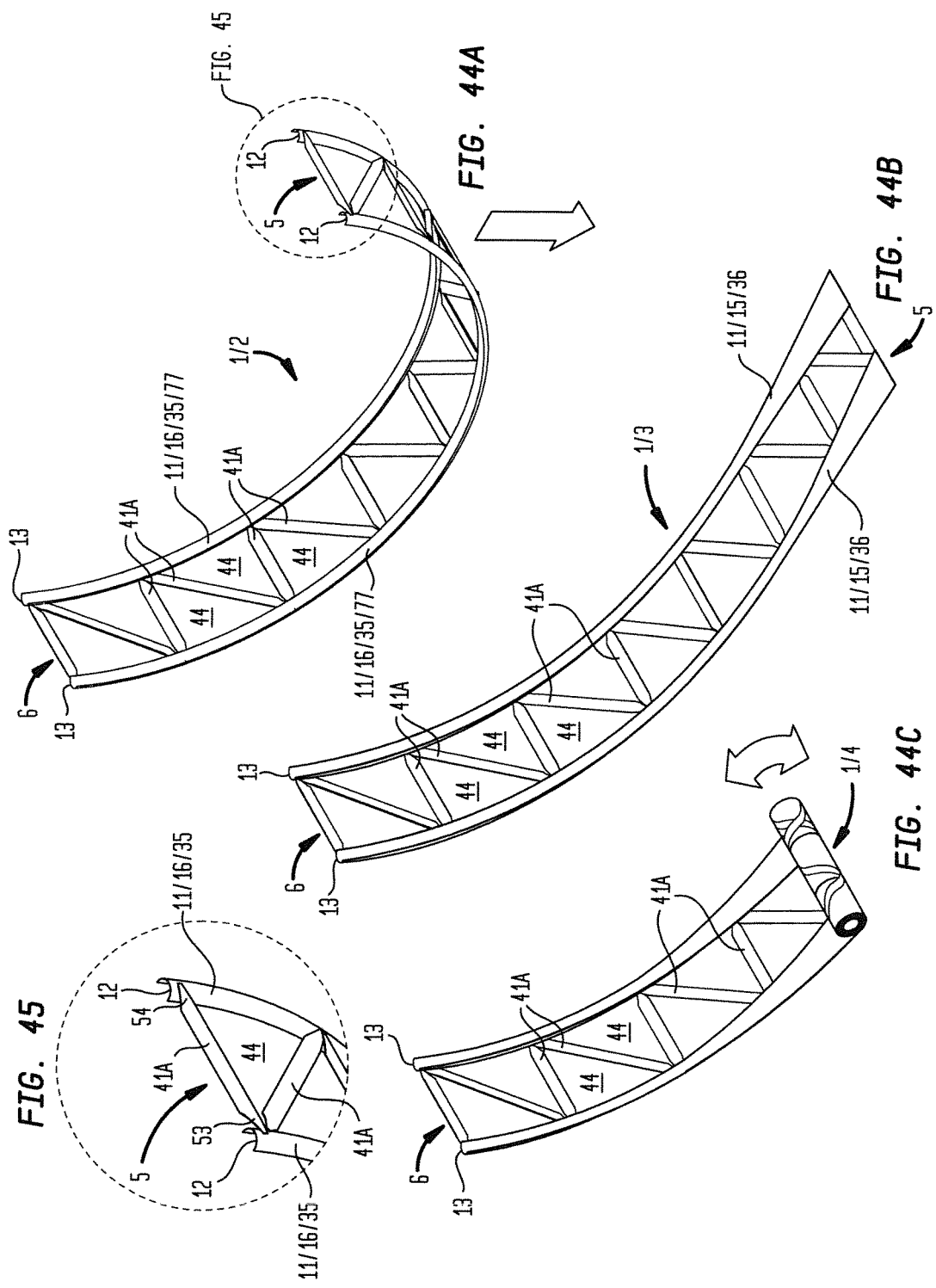

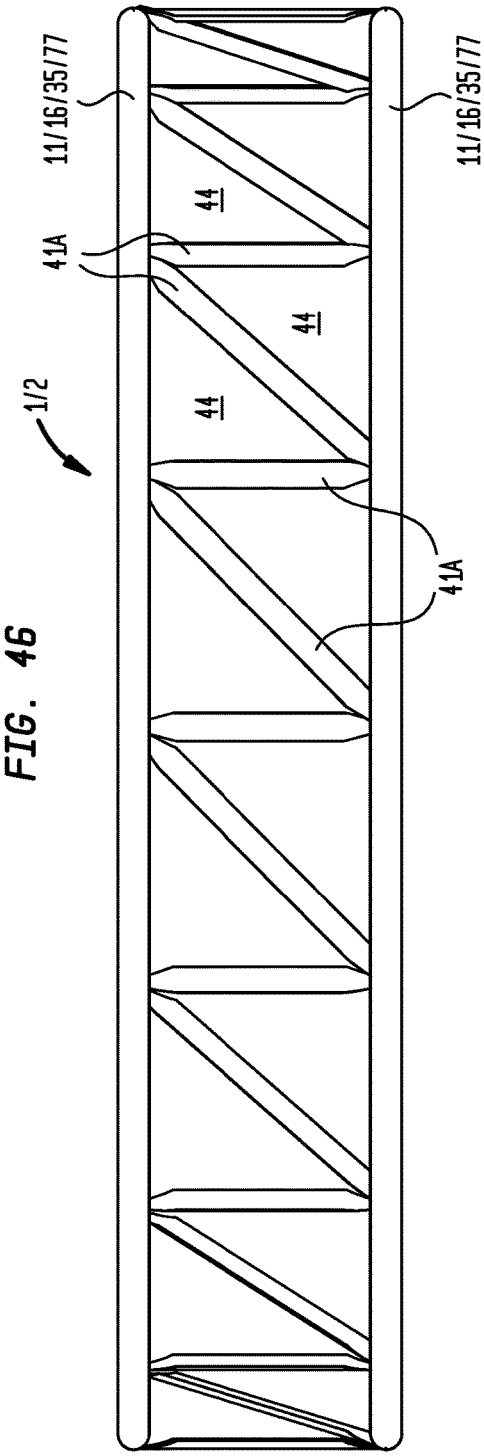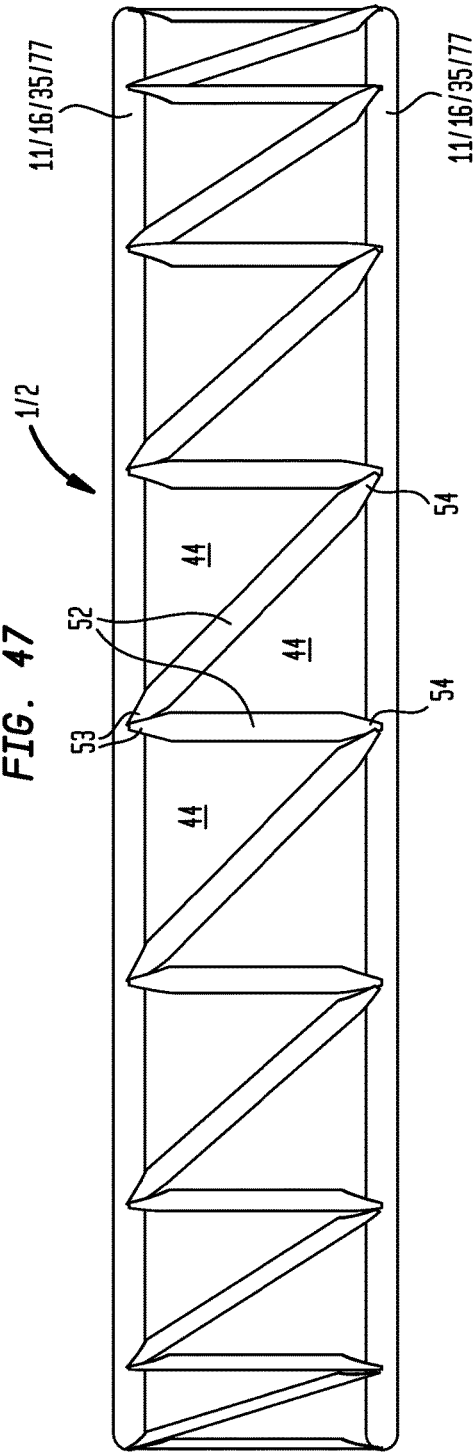
FIG. 46
FIG. 47

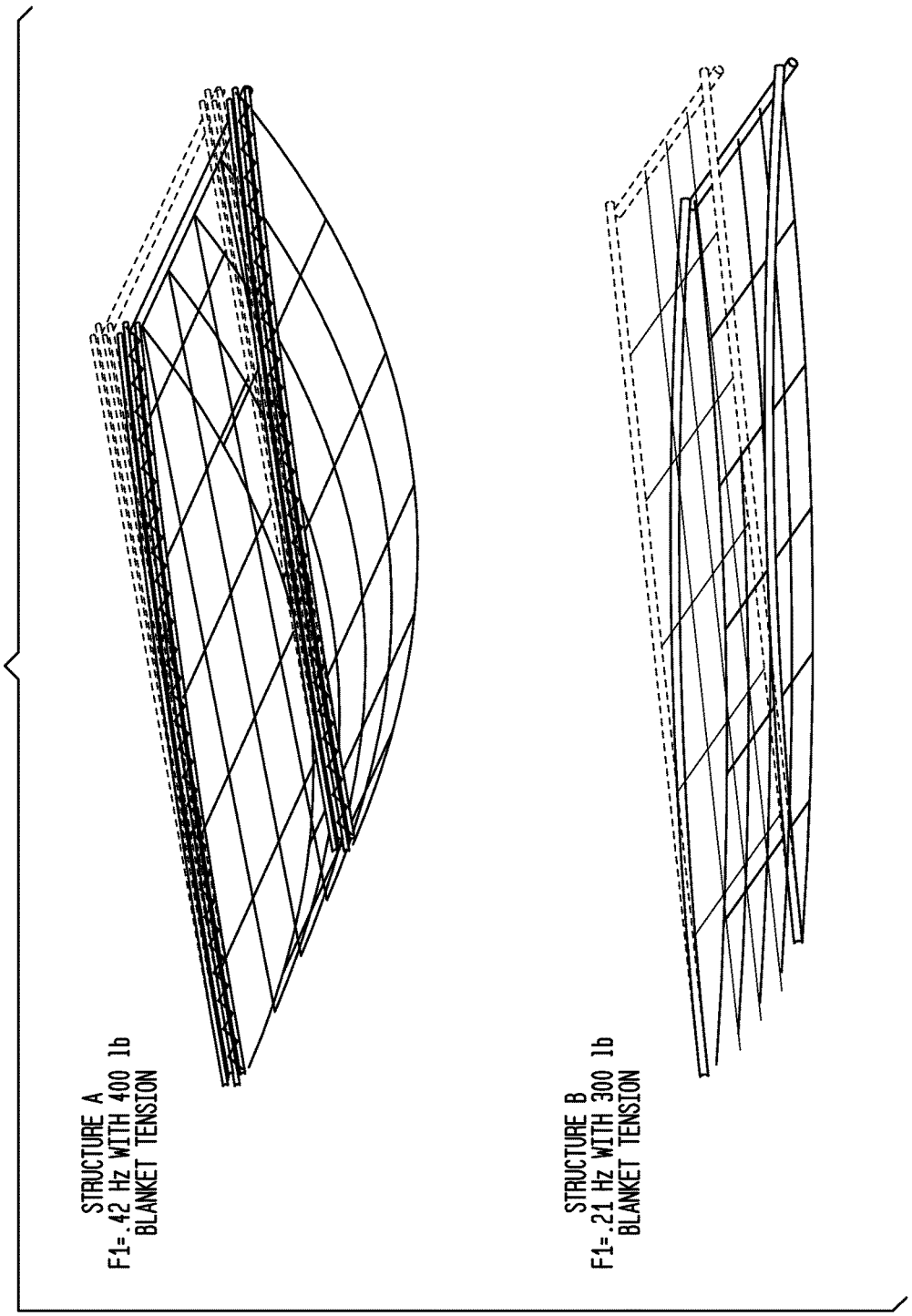

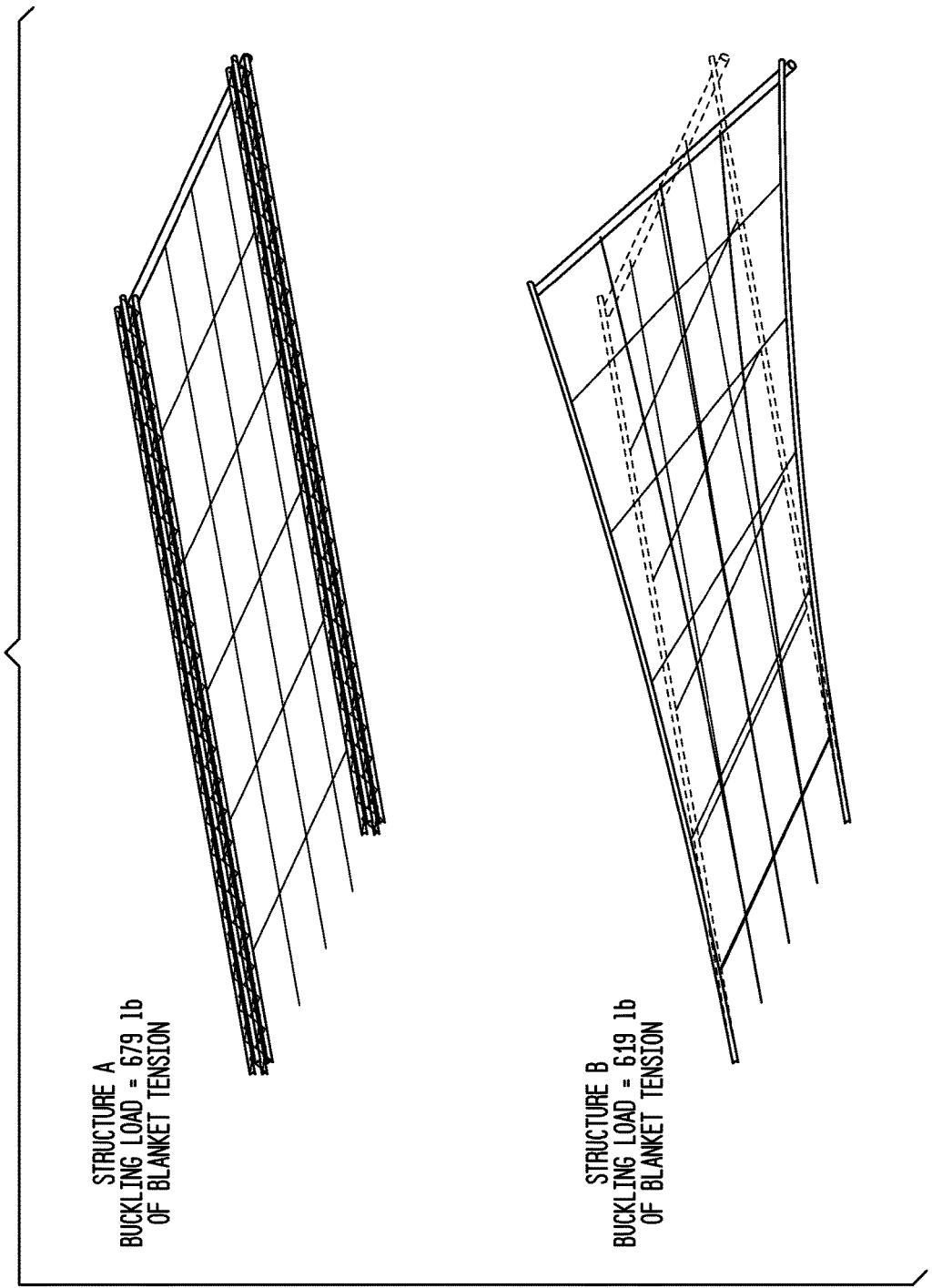

COLLAPSIBLE ROLL-OUT TRUSS

This application is the United States National Stage of International Patent Cooperation Treaty Patent Application No. PCT/US2014/016605, filed Feb. 14, 2014, which claims the benefit of U.S. Provisional Patent Application No. 61/765,641, filed Feb. 15, 2013, each hereby incorporated by reference herein.

I. TECHNICAL FIELD

Collapsible structures and methods of making collapsible structures which interconvert between a deployed condition and a collapsed planate condition which allows extensible retractable deployment of the collapsed support structure from a reduced volume rolled condition.

II. BACKGROUND

There is a need for large-mass efficient support structures which interconvert between a reduced volume stowed condition and a deployed condition having sufficient axial, bending and torsional stiffness to support blanket arrays, such as blanket solar arrays on orbit, and for other applications.

As one example, NASA's Solar Array Structures Program has embarked on an effort to develop large-scale solar arrays having sufficient area to produce 300 kilowatts constant power. Solar arrays of this type must include a support frame having sufficient strength and stiffness not only to support a tensioned photovoltaic blanket array, but also having sufficient strength and stiffness compatible with orbit spacecraft maneuvers.

Conventional structural elements used in solar arrays and many other deployable structures have historically been either a rigid truss structure or Storable Tubular Extendible Members (STEMS). Conventional rigid truss structures can have better deployed properties relating to stiffness and buckling strength than conventional monocoque or slit-tube designs. However, both of these conventional structural elements have disadvantages.

The conventional and deployable rigid truss structure includes a copious number of longerons, battens and diagonals having numerous corresponding joints that individually and collectively can include substantial deadband (range of movement in which no action occurs) and therefore the structure may lack stiffness and precision. Additionally, trusses often stack sequentially bay by bay onto themselves which can result in a relatively large stowed volume. Sequential stacking also requires some method of sequencing the deployment of the truss structure. The high part count and precision assembly requirements make conventional deployable truss structures expensive.

STEMs by contrast can provide a relatively small rolled stowed volume as compared to the truss structure. The STEM structure can be deployed by extending the tip end of the structure from the rolled stowed volume. Forces stored in the structure in the rolled stowed volume can be sufficient for deployment of a STEM structure. However, STEMs typically deploy as a slit tube structure which may lack sufficient buckling capacity and torsional stiffness to act as a support in large structures. Because of the lack of buckling and torsional stiffness, STEM structures can be scale limited.

There would be advantages in a collapsible structure of efficient mass having sufficient axial, bending and torsional stiffness even during movement from the stowed condition to the deployed condition to support large solar arrays in orbit and during orbit maneuvers and in other applications which can be extensibly retractably deployed from a reduced volume stowed condition.

III. SUMMARY OF THE INVENTION

Accordingly, a broad object of the invention can be to provide generic structural units which can be interconnected to form a wide variety of collapsible structures which interconvert between a deployed condition and a flat condition and can be further interconverted between the flat condition and a rolled condition to reduce a stowed volume.

Another broad object of the invention can be to provide generic structural units for the production of collapsible structures which include a framework of two or more longitudinal supports of a laminate configurable between a substantially planate condition and a substantially tubular condition maintained in substantially fixed relation by angled cross members to form alternately inverted triangle-shaped spaces to provide truss-like mechanics in the deployed condition of the generic structural units and overall as to the collapsible support structure.

Another broad object of the invention can be to provide longitudinal supports of a laminate configurable between a substantially flat condition and a substantially tubular condition and which can further exhibit in the tubular condition an amount of curvature between ends.

Another broad object of the invention can be to provide a method of making generic structural units useful in producing a variety of collapsible structures which include longerons configurable between a substantially flat condition and a substantially tubular condition maintained in substantially fixed spaced apart relation by a plurality of cross members which as to particular embodiments can be secured between longerons to form alternately inverted triangle-shaped open spaces providing truss-like mechanics in the deployed condition of the generic structural units and overall as to the collapsible structure.

Naturally, further objects of the invention are disclosed throughout other areas of the specification, drawings, and claims.

IV. A BRIEF DESCRIPTION OF THE DRAWINGS

FIG. 1A is perspective view of a particular embodiment of a collapsible structure in a deployed condition.

FIG. 1B is a perspective view of the particular embodiment of the collapsible structure shown in FIG. 1A in a planate condition.

FIG. 1C is a perspective view of the particular embodiment of the collapsible support shown in FIG. 1B being rolled from the tip end to achieve a rolled condition.

FIG. 2A is a perspective view of a second particular embodiment of a collapsible structure in the deployed condition.

FIG. 2B is a perspective view of the collapsible structure shown in FIG. 2A in which the planate condition is progressively achieved from the root end toward the tip end as the planate condition converts to the rolled condition within a container.

FIG. 2C is a perspective view of the second particular embodiment of the collapsible structure shown in FIG. 2B in the rolled condition within a container.

FIG. 2D is a cross section 20-20 shown in FIG. 2C which shows the rolled condition of the collapsible structure concentrically wound about a spool within a container.

FIG. 3 is a perspective view of a particular embodiment of a collapsible structure having four longerons maintained in substantially fixed relation a distance apart by cross members to define a rectangular volume.

FIG. 4 is an end view of the particular embodiment of the collapsible structure shown in FIG. 3.

FIG. 5 is an enlarged end view of a portion of FIG. 4 which shows the tubular condition of one of the four longerons in fixed relation to a pair of cross members.

FIG. 6 is an enlarged perspective view of a portion of FIG. 3 which shows the tubular condition of the four longerons in fixed relation to a plurality of cross members.

FIG. 6A is an enlarged perspective view of a portion of FIG. 6 which shows a cross member tubular condition and a cross member flat condition in broken line of one of the plurality of cross members.

FIG. 7 is an enlarged view of a portion of FIG. 5 which shows the structure of a laminate utilized in producing the longerons and cross members of particular embodiments of the collapsible structure.

FIG. 8 is a bottom view of the particular embodiment of the collapsible structure shown in FIG. 3.

FIG. 9 is a top view of the particular embodiment of the collapsible structure shown in FIG. 3.

FIG. 14 is a top view of the planate condition of the particular embodiment of the collapsible structure shown in FIG. 3.

FIG. 15 is a bottom view of the planate condition of the particular embodiment of the collapsible structure shown in FIG. 3.

FIG. 16 is a side view of the planate condition of the particular embodiment of the collapsible structure shown in FIG. 3.

FIG. 17A is a perspective view of a particular embodiment of a collapsible structure having three longerons maintained in substantially fixed relation by a plurality of cross members on two sides and flexible rods on a third side to define a triangular volume in the deployed condition.

FIG. 17B is a perspective view of the particular embodiment of the collapsible structure shown in FIG. 17A in the planate condition.

FIG. 17C is a perspective view of the particular embodiment of the collapsible structure shown in FIG. 17A in the rolled condition.

FIG. 18 is an enlarged perspective view of the particular embodiment of the collapsible structure shown in FIG. 17A in the deployed condition.

FIG. 19 is an end view of the particular embodiment of the collapsible structure shown in FIG. 18.

FIG. 20 is an enlarged end view of a portion of FIG. 19 which shows the tubular condition of one of the four longerons in fixed relation to a pair of cross members.

FIG. 21 is an enlarged view of a portion of FIG. 18 showing a pair of rod ends joined to the external curved surface of a corresponding longeron by rod end fasteners.

FIG. 22 is a top view of the particular embodiment of the collapsible structure shown in FIG. 18.

FIG. 23 is a bottom view of the particular embodiment of the collapsible structure shown in FIG. 18.

FIG. 24 is a first side view of the particular embodiment of the collapsible structure shown in FIG. 18.

FIG. 25 is a second side view of the particular embodiment of the collapsible structure shown in FIG. 18.

FIG. 26 is perspective view of the particular embodiment of the collapsible structure shown in FIG. 18 in the planate condition with rolled condition at the root end.

FIG. 27 is and end view of the particular embodiment of the collapsible structure shown in FIG. 18 in the planate condition.

FIG. 28 is a top view of the collapsible structure shown in FIG. 18 in the planate condition.

FIG. 29 is bottom view of the collapsible structure shown in FIG. 18 in the planate condition.

FIG. 31A is a perspective view of a particular embodiment of a collapsible structure having two longerons maintained in substantially fixed relation a distance apart by a plurality of cross members in the deployed condition.

FIG. 31B is a perspective view of a particular embodiment of a collapsible structure shown in FIG. 31A in the planate condition.

FIG. 31C is a perspective view of a particular embodiment of a collapsible structure shown in FIG. 31B in the rolled condition at the root end.

FIG. 32 is an enlarged perspective view of the particular embodiment of a collapsible structure shown in FIG. 31A.

FIG. 33A is an end view of the particular embodiment of the collapsible structure shown in FIG. 32 having the longeron longitudinal edges of each longeron in a substantially similar orientation.

FIG. 33B is an end view of the particular embodiment of the collapsible support shown in FIG. 32 having the longeron longitudinal edges of each longeron in a substantially dissimilar orientation.

FIG. 34 is an enlarged view of a portion of the particular embodiment of the collapsible structure shown in FIG. 32.

FIG. 35 is a bottom view of the particular embodiment of the collapsible structure shown in FIG. 32.

FIG. 36 is a top view of the particular embodiment of the collapsible structure shown in FIG. 32.

FIG. 37 is a first side view of the particular embodiment of the collapsible structure shown in FIG. 32.

FIG. 38 is a second side view of the particular embodiment of the collapsible structure shown in FIG. 32.

FIG. 39 is a top perspective view of the particular embodiment of the collapsible structure shown in FIG. 32 in the planate condition.

FIG. 40 is an end view of the particular embodiment of the collapsible structure shown in FIG. 39.

FIG. 41 is a top view of the particular embodiment of the collapsible structure shown in FIG. 39.

FIG. 42 is a bottom view of the particular embodiment of the collapsible structure shown in FIG. 39.

FIG. 43 is side view of the particular embodiment of the collapsible structure shown in FIG. 39.

FIG. 44A is a perspective view of a particular embodiment of a collapsible structure in the deployed condition having two longerons each having an amount of curvature between a longeron first end and a longeron second end maintained in substantially fixed relation by a plurality of cross members.

FIG. 44B is a perspective view of the particular embodiment of the collapsible structure shown in FIG. 44A in which the planate condition is progressively achieved from the root end.

FIG. 44C is a perspective view of the particular embodiment of the collapsible structure shown in FIG. 44B in which the rolled condition is progressively achieved from the root end.

FIG. 45 is an enlarged end view of the particular embodiment of the collapsible structure shown in FIG. 44A.

FIG. 46 is a top view of the particular embodiment of the collapsible structure shown in FIG. 44A.

FIG. 47 is a bottom view of the particular embodiment of the collapsible structure shown in FIG. 44A.

FIG. 56 is an illustration of the first fundamental frequency of the collapsible structure as shown in FIG. 3 as compared to the first fundamental frequency of a conventional split tube structure.

FIG. 57 is an illustration which compares buckling capacity with axial load between the collapsible structure as shown in FIG. 18 and a conventional slit tube structure.

V. DETAILED DESCRIPTION OF THE PREFERRED EMBODIMENTS

Figure 10:
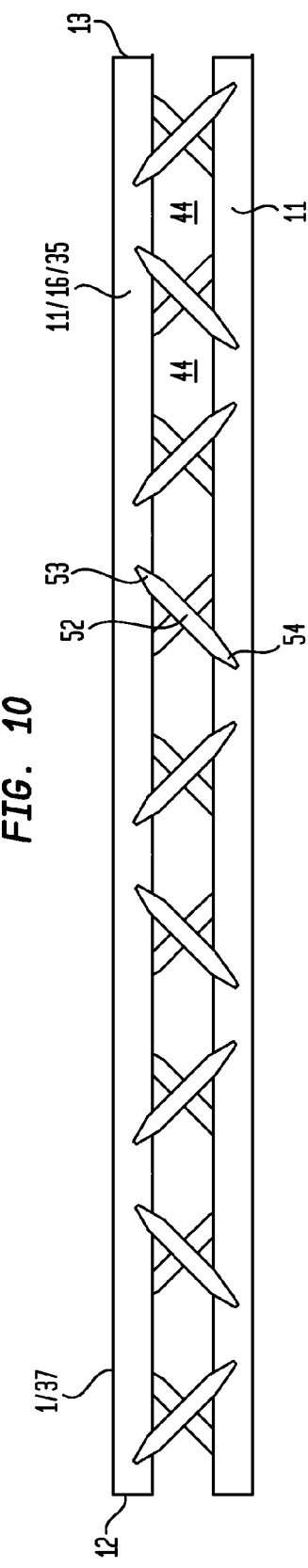
FIG. 10 is a first side view of the particular embodiment of the collapsible structure shown in FIG. 3.
Figure 11:
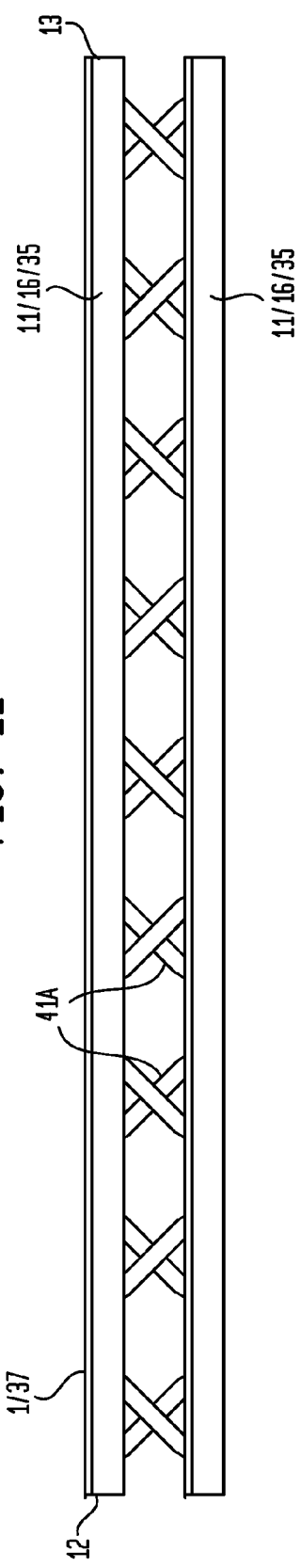
FIG. 11 is a second side view of the particular embodiment of the collapsible structure shown in FIG. 3.

Generally referring to FIGS. 1 through 57, illustrative examples are shown of embodiments of an inventive collapsible structure (1) which interconvert between a deployed condition (2) and a planate condition (3) (as shown in the examples of FIGS. 1A and 1B and FIGS. 2A and 2B). The planate condition (3) of embodiments of the collapsible support structure (1) can further interconvert between the planate condition (3) and a rolled condition (4) to reduce the volume of the collapsible structure (as shown in the examples of FIG. 1C and FIGS. 2B through 2D). The rolled condition (4) of embodiments of the collapsible structure (1) can be achieved by concentrically winding or coiling the planate condition (3) from either a root end (5) or a tip end (6) of the collapsible structure (1). The planate condition (3) can store sufficient mechanical energy during conversion from the deployed condition (2) to the planate condition (3) to convert the planate condition (3) toward the deployed condition (2) as the rolled condition (4) unwinds extending the root end (5) or the tip end (6) of the planate condition (3).

For the purposes of this invention the term "deployed condition" means the condition of an embodiment of the collapsible structure in which the longerons interconnected by a plurality of cross members generally unfurl to assume a three dimensional form.

For the purposes of this invention the term "planate condition" means the condition of an embodiment of the collapsible structure in which the longerons interconnected by a plurality of cross members flatten to assume a tabular form having a length and width disposed in a relatively broad flat expanse in relation to the thickness.

Now referring primarily to FIGS. 1A through 1C, which provide an illustrative example of embodiments of the collapsible structure (1) which interconvert between a deployed condition (2) (as shown in the example of FIG. 1A) and a planate condition (3) (as shown in the example of FIG. 1B).

The planate condition (3) of the collapsible structure (1) can be wound into the rolled condition (4) from the tip end (6) (as shown in the example of FIG. 1C). As to particular embodiments, the collapsible structure (1) can be releasably secured or fixedly coupled proximate the root end (5) to an article of manufacture (7) and the rolled condition (4) achieved by concentrically winding the planate condition (3) about a roll axis (4A) from the tip end (6) toward the root end (5).

Now referring primarily to FIGS. 2A through 2D, which provide an illustrative example of embodiments of the collapsible structure (1) which interconvert between the deployed condition (2) (as shown in the example of FIG. 2A) toward the planate condition (3) (as shown in the example of FIG. 2B). The planate condition (3) of the collapsible structure (1) can be concentrically wound into the rolled condition (4) commencing from the root end (5) (as shown in the example of FIGS. 2B through 2D). As to particular embodiments, the root end (5) of the planate condition (3) can be wound to generate a first winding of the rolled condition (4) with continued rotation of the rolled condition (4) at the root end (5) drawing the tip end (6) toward the root end (5). As to particular embodiments, a spool (8) can be coupled to the root end (5) about which the planate condition (3) can be wound. Rotation of the spool (8) responsive to a spool winder (8A) (whether a hand crank, a motor, or other winder element) can wind the planate condition (3) about the spool (8) drawing the tip end (6) toward the root end (5). As to particular embodiments, the root end (5) can be disposed in a container (9) having a container internal surface defining a chamber (10) into which the planate condition (3) of the collapsible structure (1) retracts concentrically winding into the rolled condition (4) inside of the chamber (10) of the container (9). As to those embodiments that concentrically wind the planate condition (3) about a spool (8), the spool (8) can be rotatably coupled inside of the container (9), whereby rotation of the spool (8) can concentrically wind the planate condition (3) of the collapsible structure (1) about the spool (8) to dispose the rolled condition (4) of the collapsible structure (1) inside of the chamber (10) of the container (9).

The deployed condition (2) can be achieved by unwinding the rolled condition (3) to extend the tip end (6) outward from the rolled condition (4). The planate condition (3) (or that portion of the planate condition (3)) paid out from the rolled condition (4) can move toward the deployed condition (2) in response to mechanical energy stored in the planate condition (3) of the collapsible structure (1).

Now referring primarily to FIGS. 12 through 16, as to particular embodiments, a spool (8) can be coupled to the tip end (6) about which the planate condition (3) can be concentrically wound. The deployed condition (2) can be achieved by unwinding the rolled condition (4) from the root end (5) toward the tip end (6). The planate condition (3) (or that portion of the planate condition (3)) paid out from the rolled condition (4) can move toward the deployed condition (2) in response to mechanical energy stored in the planate condition (3) of the collapsible structure (1).

Now referring primarily to FIGS. 3 through 7, particular embodiments of the collapsible structure (1) can take the form of at least two longitudinal supports (also referred to as "longerons") (11) each having a longeron length (11A) disposed between a longeron first end (12) and a longeron second end (13). Each longeron (11) can be made of a laminate (14) configurable along the longeron length (11A) between a longeron flat condition (15) (as shown in the examples of FIG. 1B and FIG. 2B) and a longeron tubular condition (16) (as shown in the examples of FIG. 1A, FIG. 2A and FIG. 5). While the longeron tubular condition (16) of each longeron (11) as shown in FIG. 3 through FIG. 7 comprises a semi-tubular structure (17) disposed about a longeron longitudinal axis (18) having opposed longeron internal and longeron external curved surfaces (22)(23) which define a substantially circular arc (17A) disposed between a pair of longitudinal edges (20)(21) having an arc length of about 180 degrees. Depending upon the application, the substantially longeron tubular condition (16) having opposed longeron internal and longeron external curved surfaces (22)(23) can define a circular arc (17A) between the pair of longeron longitudinal edges (20)(21) having an arc length of between about 90 degrees and 360 degrees (as shown in broken line in the example of FIG. 5). As to particular embodiments of the longeron (11), the pair of longeron longitudinal edges (20)(21) may be disposed to allow a part of the longeron internal curved surface (22) and a corresponding part of the longeron external curved surface (23) to overlap (24) (as shown in broken line in the example of FIG. 5).

Now referring primarily to FIG. 7, as to particular embodiments, the longerons (11) can be provided as a laminate (14) constructed by uniting two or more layers of laminatable material (25) together. The process of creating a laminate (14) conventionally includes impregnating or applying an adherent material (26) in or between the layers of laminatable material (25). Sufficient heat (27) or pressure (28), or both, can be applied to the layers of laminatable materials (25) and the adherent material (26) to produce the laminate (14). Heat (27) can be applied in a range of between about 10 degrees centigrade ("° C.") to about 400° C. and pressure (28) can be applied in a range of between about 15 pounds per square inch ("psi") to about 50,000 psi depending upon the composition, number, thickness, size, porosity, or other factors relating to the layers of laminatable materials (25); the source of pressure (28) (whether vacuum pressure, atmospheric pressure, mold pressure, or the like); or the source of heat (27) (whether applied directly through a mold, or indirectly from a remote heat source). As to particular embodiments, the laminate (14) can be formed about a cylindrical mold (29) to yield the longeron tubular condition (16) having a curved surface (19) defining a substantially circular arc (17A) disposed between the pair of longeron longitudinal edges (20)(21) in a desired radius, degree angle, or amount of overlap (24), as above described.

As to particular embodiments of the longerons (11), a first laminatable material (30) or a second laminatable material (31), or both, can further include a plurality of crossed fibers (32) disposed in or parallel to the plane of the laminate (14) with each of the plurality of crossed fibers (32) being at an angle between 0 degrees and 90 degrees to a first laminate axis (33), such that the laminate (14) can interconvert between the substantially tubular condition (16) and the substantially flat condition (15). The plurality of crossed fibers (32) can be resiliently disposed in said laminate (14) which allows the plurality of crossed fibers (32) to return toward the original configuration after bending, stretching, or being compressed.

For the purposes of this invention, the term "longeron tubular condition" means as to the entire length, or a portion of the length, the longeron can have an internal curved surface which defines a generally circular arc of radius between a pair of longitudinal edges.

For the purposes of this invention, the term "longeron flat condition" means as to the entire length, or a portion of the length, the longeron has a substantially flat surface. For example, as to particular embodiments, application of forces upon the longeron can achieve a substantially flat surface along a portion or the entire length of a longeron, while as to other embodiments the longeron can achieve a substantially flat surface proximate the application of forces with progressively greater curvature in the longeron internal surface occurring with increased distance from the application of forces.

The longeron flat condition (15) of a longeron (11) achieved as part of the planate condition (3) of the collapsible structure (1) (as shown in the examples of FIG. 1B and FIG. 2B) can, as to particular embodiments, provide opposed longeron external and internal flat surfaces (15A)(15B) which can take the form of a first stable condition (35) which can be further disposed in the rolled condition (4) of the collapsible structure (1), and upon extension of the longeron (11) from the rolled condition (4), the plurality of crossed fibers (32) resiliently disposed in a direction at some angle to a second laminate axis (34) bias the laminate (14) toward the longeron tubular condition (16) to provide a second stable condition (36) of the longeron (11) as part of the deployed condition (2) of the collapsible structure (1) (as shown in the examples of FIG. 1A and FIG. 2A).

The layers of laminatable material (25) used to produce the laminate (14) of a longeron (11) can be in the form of discrete or woven fibers including for example: boron carbide fibers, silicon carbide fibers, alumina fibers, alumina titanium fibers, carbon fibers, para-aramid fibers such as KEVLAR, polypropylene such as INNEGRA, a ultra-high molecular weight polyethylene such as DYNEEMA or SPECTRA, s-glass, e-glass, polyester, or the like, or combinations thereof.

The layers of laminatable material (25) can be coated or impregnated with an amount of adherent material (26) having suitable mechanical characteristics, including for example: a phenolic, an epoxy, a polyethylene a terephtalate, a vinylester, bis(maleimide/diallybisphenol A, a cyanate ester, a nylon, a polypropylene, polyethylene terephthalate, polyethersulfone, polyetheretherketone, acrylonitrile butadiene styrene, a polyamide, a polyethylene, a thermoplastic urethane, or the like, which can be either catalytically or thermally set, or combinations thereof.

Now referring primarily to FIG. 1A through FIG. 1C, FIG. 2A through FIG. 2C, and FIG. 3 through FIG. 16, particular embodiments of the collapsible structure (1) can include four longerons (11) which in the deployed condition (2) correspondingly define the location of four longeron longitudinal axes (18) which define a rectangular volume (37) having length (38), width (39) and height (40) (as shown in the examples of FIG. 1A and FIG. 2A). Particular embodiments of the collapsible structure (1) having four longerons (11) can provide each longeron (11) in a longeron tubular condition (16) having a curved surface (19) between a pair of longeron longitudinal edges (20)(21) defining a generally circular arc (17A) having an arc length of about 180 degrees. The curved surface (19) of each longeron (11) in the longeron tubular condition (16) can define a longeron radius of about one quarter inch to about six inches about a corresponding one of the longeron longitudinal axis (18). As an illustrative example, the deployed condition (2) can define a rectangular volume (37) having a width (39) of about fourteen inches and a height (40) of about eight inches and a length (38) of about twenty feet; however, other embodiments are not so limited and the circular arc (17A) can have an arc length and radius adjusted and scaled over a wide range to provide a particular radial and torsional rigidity and buckling resistance in the longeron tubular condition (16) necessary to achieve a particular length (38), width (39), and height (40) of a particular rectangular volume (37) defined by the deployed condition (2) of the collapsible support structure (1).

Again referring primarily to FIG. 1A through FIG. 1C, FIG. 2A through FIG. 2C, and FIG. 3 through FIG. 16, the four longerons (11) defining the rectangular volume (37) in the deployed condition (2) can be maintained in substantially fixed relation by a plurality of cross members, (41) each having a cross member length (42) disposed longitudinally between cross member first end (53) and a cross member second end (54), each correspondingly secured in tangential relation to a longeron surface (20)(21)(22)(23) of a pair of longerons (11). The plurality of cross members (41) can be disposed between a pair of longerons (11) as a plurality of diagonal cross members (41A) which bound alternately inverted triangle-shaped open spaces (44) (as shown in the example of FIG. 8) along the rectangular volume length (38) of each of the four sides (43) of the rectangular volume (37) defined by the four longerons (11). The plurality of cross members (41) can be disposed between a pair of longerons (11) as a plurality vertical cross members (41B) which as to particular embodiments divide the alternately inverted triangular-shaped open spaces (44) (as shown in the example of FIG. 8 in broken line). The diagonal cross members (41A) and the vertical cross members (41B) can be disposed to provide truss-like mechanics in the deployed condition (2) of the collapsible support structure (1).

The term "triangle-shaped open spaces" for the purposes of the instant invention encompasses inverted isosceles triangle-shaped open spaces having a base about twice the width of the height as shown in the example of FIG. 8, inverted truncated triangle-shaped open spaces (as shown in the example of FIG. 10) and other similar triangle-shaped open spaces such as right triangular-shaped open spaces created by disposing the diagonal cross members (41A) and vertical cross members (41B) to subdivide the rectangular area (45) of each one of the four sides (43) of the rectangular volume (37).

Now referring primarily to FIG. 6 and FIG. 6A, embodiments of the plurality of cross members (41) whether disposed as diagonal cross members (41A) or as vertical cross members (41B) can be made of laminate (14) in the manner above described for the longerons (11). The plurality of cross members (41) can each be configurable along the cross member length (42) between a cross member flat condition (46) having opposed cross member internal and external flat surfaces (46A)(46B) disposed between a pair of cross member longitudinal edges (50)(51) (as shown in the example in FIG. 6A in broken line) and a cross member tubular condition (47) having opposed cross member internal and external curved surfaces (49A)(49B) disposed between a pair of cross member longitudinal edges (50)(51) (as shown in the example of FIG. 6A in solid line).

Each diagonal cross member (41A) or vertical cross member (41B) in the cross member tubular condition (47) can be disposed about a diagonal cross member longitudinal axis (47A) or a vertical cross member longitudinal axis (47B). As to particular embodiments the cross member tubular condition (47) can provide a cross member tubular condition (47) having semi-tubular structure having internal curved surface (49A) disposed between a pair of cross member semi-tubular structure longitudinal edges (50)(51) which defines an arc length of between about forty-five degrees to about ninety degrees and having a radius of between about one-half the radius to about one radius of the corresponding longerons (11). Each diagonal cross member (41A) and vertical cross member (41B) can be made of a laminate (14) that has a first stable condition (35) in the cross member flat condition (46)) or a second stable condition (36) in the cross member tubular condition (47), as described above for the longerons (11), the cross member flat condition (46) can be disposed in the rolled condition (3) of the collapsible structure (1).

Each of the plurality of cross members (41) whether a diagonal cross member (41A) or a vertical cross member (41B) can have a medial portion (52) disposed between a cross member first end (53) and a cross member second end (54) each cross member end (53)(54) correspondingly tangentially secured to a longeron surface (20)(21)(22)(23) (as shown in the example of FIG. 6). With respect to particular embodiments, each of the cross member first and second ends (53)(54) can be disposed toward the cross member flat condition (46) with the medial portion (52) retaining the cross member tubular condition (47). The cross member ends (53)(54) can be joined to a longeron surface (20)(21)(22)(23) using mechanical fasteners (55) (such as one or more of rivets, threaded bolt and nut, staple, or the like) (as shown in the example of FIG. 8). As to other embodiments, the cross member first and second ends (53)(54) can be disposed toward the cross member flat condition (46) and joined to the longeron surface (20)(21)(22)(23) (in the embodiment shown the longeron external curved surface (23) by a securement material (56) (such as one or more of epoxy, polyurethane, silicone rubber, polyethylene, polypropylene, or the like). Again as to other embodiments, the cross member first end (53) and the cross member second end (54) can be formed with the longeron (11) as a one-piece collapsible structure (1). Regardless of the method of securement, as to particular embodiments, the coupled surfaces of the plurality of cross members (41) and the longerons (11) do not articulate other than operating elastically allowing the diagonal cross members (41A) and the vertical cross members (41B) to be joined to the longerons (11) with a preload sufficient to increase axial, torsional rigidity and resistance to buckling or without or having a reduced deadband in the deployed condition (2) of the collapsible support structure (1). As to other particular embodiments, the cross member first end (53) and the cross member second end (54) can be secured to allow a pre-determined lesser or greater degree of articulation at one or more of the joints.

Again referring primarily to FIG. 1A, FIG. 2A and FIG. 4, as to particular embodiments, each of the four longerons (11) of the collapsible structure (1) in the deployed condition (2) can be maintained in substantially similar fixed radial relation about the corresponding longeron longitudinal axis (18) by the diagonal cross members (41A) and vertical cross members (41B) orienting the curved surface (19) between the corresponding pair of longitudinal edges (20)(21) of each longeron (11) in the longeron tubular condition (16) in substantially the same direction or orientation. As shown in the example of FIG. 4, the curved surface (19) of each of the four longerons (11) can have substantially the same orientation about the corresponding longeron longitudinal axis (18); however, particular embodiments can dispose one or more of the longerons (11) in substantially dissimilar radial relation about the corresponding longeron longitudinal axis (18) (see also the examples of FIG. 33A and FIG. 33B).

Now referring primarily to FIG. 5, while the particular embodiment of the collapsible structure (1) shown, locates the pair of longeron longitudinal edges (20)(21) in the longeron tubular condition (16) at about 135 degrees and 315 degrees respectively in relation to 0 degrees, this is not intended to be limiting with respect to disposing the curved surface (19) of each longeron (11) in fixed radial relation about the corresponding longeron longitudinal axis (18) at other degree orientations depending upon the application.

Now referring primarily to FIG. 1A and FIG. 2A, applying lateral force (57) at the root end (5) or the tip end (6) of the collapsible structure (1) against any unsecured longeron (11) can move the four longerons (11) proximate the root end (5) or the tip end (6) toward the planate condition (3) with the remaining length (58) of the collapsible structure (1) progressively (and not sequentially) moving toward the planate condition (3) as the lateral force (57) transfers along the remaining length (58) of the collapsible support structure (1). As shown in the example of FIG. 2A, sufficiently long collapsible structures (1) configured as above described can be disposed in the planate condition (3) proximate the root end (5) or the tip end (6) while the opposed root end (5) or tip end (6) can be maintained in the deployed condition (2). As to particular embodiments, the planate condition (3) of the root end (5) can be progressively disposed in the rolled condition (4) as lateral forces (57) progressively collapse the collapsible structure (1) toward the planate condition (3) at the opposed root end (5) or tip end (6).

Now referring primarily to FIG. 1A, FIG. 1B, FIG. 2A, and FIG. 2B, as to particular embodiments, the four longerons (11) of the collapsible structure (1) can define a rectangular volume (37) which has a greater width (39) and a lesser height (40), the dimensions of the width (39) and the height (40) can be selected to afford a planate condition (3) in which the longerons (11) lie adjacent one another and do not overlap (as shown in the example of FIG. 1B and FIG. 2B) providing the advantage of reducing the thickness of the planate condition (3) and correspondingly the diameter of the rolled condition (4).

Figure 12:
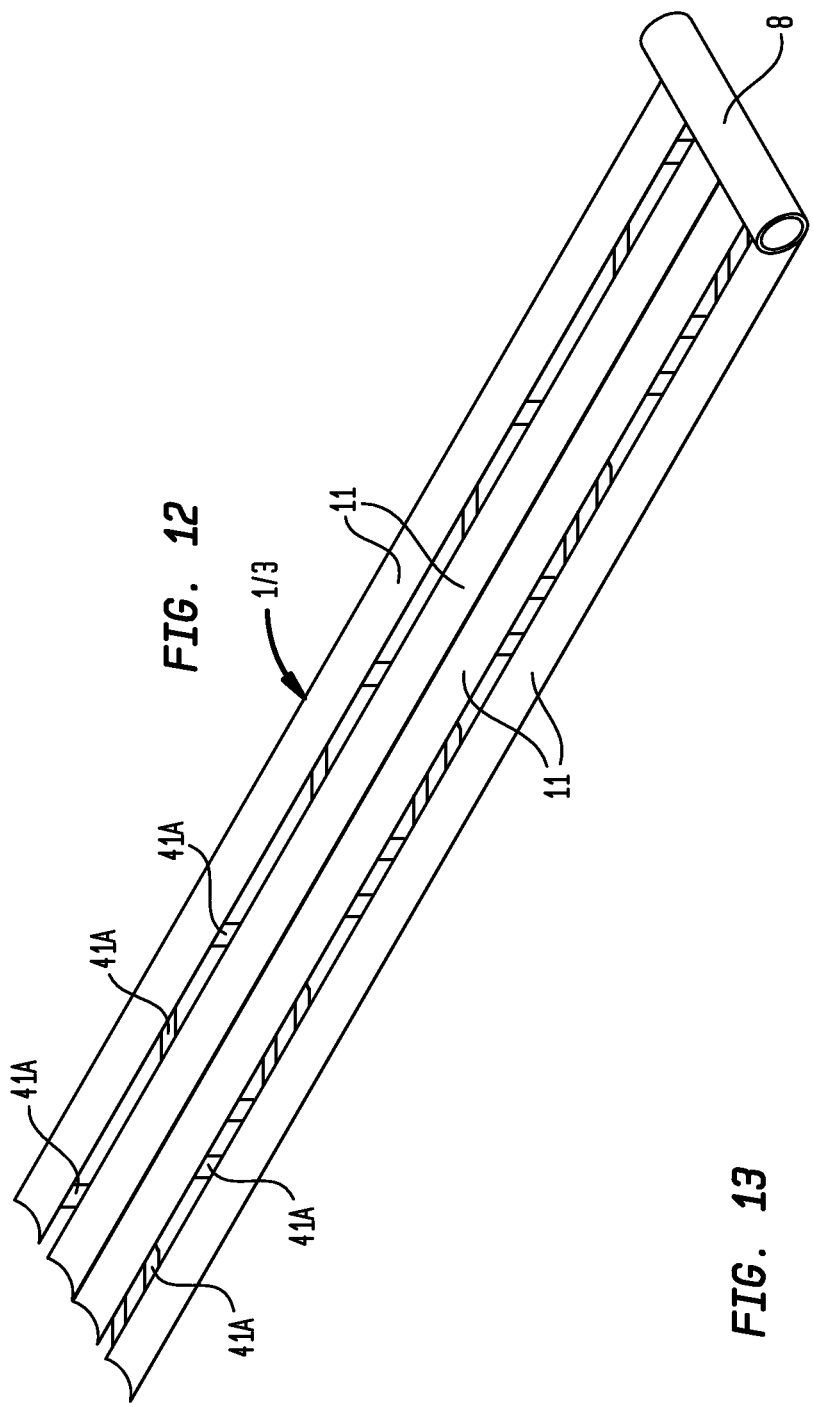
FIG. 12 is a perspective view of the planate condition of the particular embodiment of the collapsible structure shown in FIG. 3 having a spool coupled to the tip end.
Figure 13:
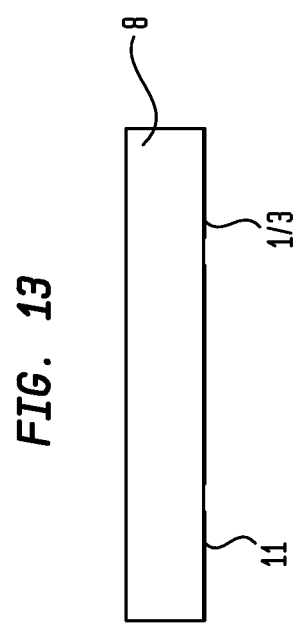
FIG. 13 is tip end view of the flat condition of the particular embodiment of the collapsible structure shown in FIG. 3 having a spool coupled to the tip end.

Now referring primarily to FIG. 12, the planate condition (3) of the collapsible structure (1) can be disposed in the rolled condition (4) with the longeron internal curved surfaces (22) in the longeron flat condition (15) facing toward a roll axis (4A) of the rolled condition (4) (also referred to as the "forward sense") or in the alternative can be disposed in the rolled condition (4) with the longeron internal curved surface (22) (11) in a substantially flat condition (15) facing away from the roll axis (4A) of the rolled condition (4) (also referred to as "reverse sense"). The rolled condition (4) in the reverse sense can allow for greater deployment torque and can accommodate a laminate (14) having a greater amount of stiffness.

As to particular embodiments of the collapsible structure (1), the rolled condition (4), whether the cross members (41) are disposed in the forward sense or in the reverse sense, can be dimensionally stable and the concentric windings of the rolled condition (4) will not exert radial forces (60) or axial forces (61) acting to move the concentric windings radially to increase the diameter of the rolled condition (4) or to move the windings axially to increase the width of the rolled condition (4). Accordingly, embodiments of the collapsible support structure (1) in accordance with the invention do not require a spool (8) whether cylindrical (or other configuration) about which the planate condition (3) concentrically winds toward the rolled condition (4). Nor does the rolled condition (4) require a container (9) to enclose or contain the rolled condition (4).

Figure 30:
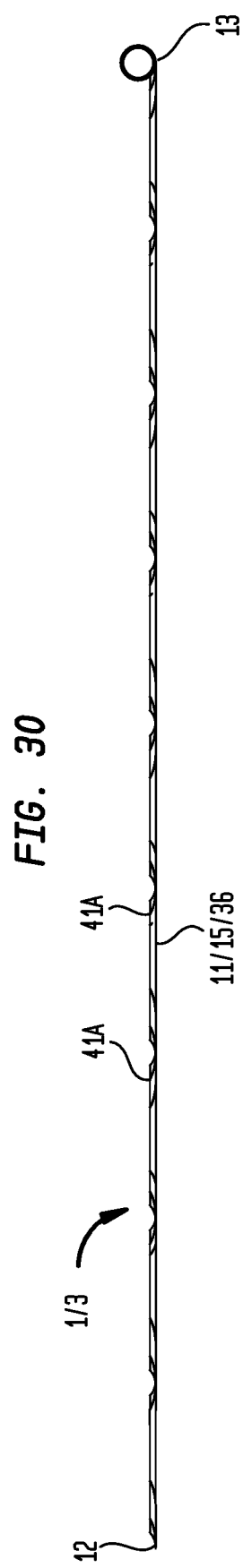
FIG. 30 is a side view of the collapsible support shown in FIG. 18 in the planate condition.
Figure 48:
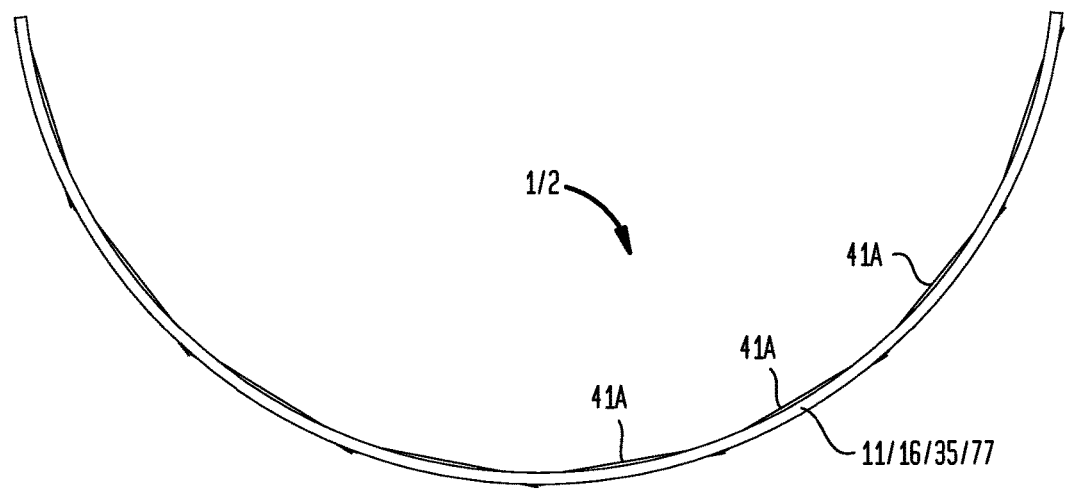
FIG. 48 is a side view of the particular embodiment of the collapsible structure shown in FIG. 44A.
Figure 49:
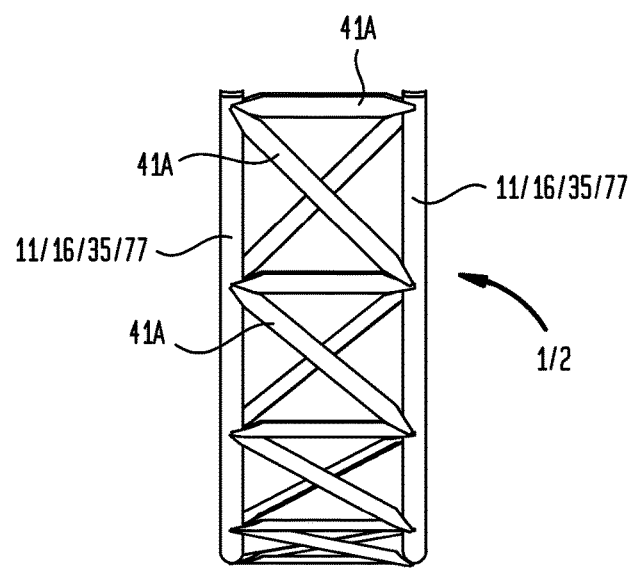
FIG. 49 is an end view of the particular embodiment of the collapsible structure shown in FIG. 44A.

Now referring primarily to FIG. 17A through FIG. 17C and FIG. 18 through FIG. 30, which show an embodiment of the collapsible structure (1) which defines a triangular volume (62) in the deployed condition (2). Embodiments of the collapsible structure (1) defining a triangular volume (62) can interconvert between a deployed condition (2) (as shown in the examples of FIG. 17A, FIG. 18, and FIG. 22 through FIG. 25) and a planate condition (3) (as shown in the examples of FIG. 28 through FIG. 30) which can then be disposed in the rolled condition (4) (as shown in the example of FIG. 17C, the embodiment having structural elements made and used in a manner similar to that above described for the collapsible structure (1) defining a rectangular volume (37) whether including a spool (8) (as shown in the example of FIG. 17B, FIG. 26 and FIG. 27) or a container (9) (similar to that above described and shown in FIG. 2A through FIG. 2C) or a spool (8) rotatably coupled within a container (9).

Now referring primarily to FIG. 17A, FIG. 18, and FIG. 19 as illustrative examples, the collapsible structure (1) defining a triangular volume (62) in the deployed condition (2) can have a base (63) of about fourteen inches and a height (64) from the base (63) to the apex (65) of about eight inches and a length (66) of about eight feet. The longerons (11), diagonal cross members (41A), and vertical cross members (41B) can be provided as above described, and in the context of the illustrative examples shown, the longeron tubular condition (16) can be in the form of a semi-tubular structure (17) disposed about a longeron longitudinal axis (18) defining a curved surface (19) having a radius of about two inches, disposing a pair of longeron longitudinal edges (20)(21) about 180 degrees apart.

Particular embodiments of the collapsible structure (1) defining a triangular volume (62) can be disposed in the planate condition (3) as above described with the longeron (11) disposed at the apex (65) of the triangular volume (62) nested between the two longerons (11) defining the base (63). Consequently, one set of diagonal cross members (41A) defining a triangular volume first side (67) must fold between the diagonal cross members (41A) defining the base (63) and the triangular volume second side (68). These diagonal cross members (41A) of the triangular volume first side (67) can be provided in the form of resiliently flexible rods (69) (such as one or more of fiberglass rods, carbon fiber rods, or the like) (as shown in the example of FIG. 17A). While the embodiment shown in the Figure has resiliently flexible rods (69) of fiberglass with a diameter of about one-eighth inch, the resiliently flexible rods (69) are scalable depending upon the application and can have a cross sectional configuration other than circular. The resiliently flexible rods (69) can bow inwardly as the collapsible structure (1) moves toward the planate condition (3) (as shown in the example of FIG. 17A and FIG. 17B) and then disposed in the rolled condition (4) (as shown in the example of FIG. 17C) to provide a rolled condition (4) having a diameter of about three and a half inches and a width of about sixteen inches; however, the example is not intended to be limiting but rather illustrative of the scalable range of the collapsible structure (1). The resiliently flexible rods (69) can store forces which can act to move the collapsible structure (1) from the planate condition (3) to the deployed condition (2) and then act in the deployed condition (2) as tension/compression rods in accordance with conventional truss mechanics.

The flexible rods (69) can be incorporated into other embodiments of the collapsible structure (1), and as an illustrative example, in the four longeron (11) embodiment by interconnection between two longerons (11) which lie adjacent in the planate condition (3). As an alternative illustrative example in the four longeron (11) embodiment, two non-adjacent longerons (11) which do not lie adjacent in the planate condition (3) can be interconnected with one or more elastically tensioned members capable of moving the longerons (11) toward the deployed condition (2). As another alternative illustrative example, cables connected to longerons which upon being shorted by a cable retraction assembly can move the longerons (11) toward the deployed condition (2).

Now referring primarily to FIG. 18 through FIG. 25, the length of the resiliently flexible rods (69) can be disposed between a pair of rod ends (70)(71) which can be joined to the internal curved surface (22) or the longeron external curved surface (23) by rod end fasteners (72) (such as threaded bolt and nut (73) passing through an eyelet (74) as shown in the examples of FIG. 20 and FIG. 21) which can as to particular embodiments provide a degree of articulation between each one of the pair of rod ends (70)(71) and the longeron (11) to facilitate movement from the deployed condition (2) to the planate condition (3) of the collapsible structure (1).

Now referring primarily to FIG. 31 through FIG. 43, embodiments of the collapsible structure (1) in the deployed condition (2) can include a pair of longerons (11) in the longeron tubular condition (16) disposed in fixed relation a distance apart by a plurality of diagonal cross members (41A) or vertical cross members (41B). Embodiments of the collapsible structure (1) having a pair of longerons (11) can interconvert between the deployed condition (2) (as shown in the examples of FIG. 31A, and FIG. 32 through FIG. 38) and a planate condition (3) (as shown in the examples of FIG. 39 through FIG. 43) which can then be disposed in the rolled condition (4) (as shown in the example of FIG. 31C), the embodiments having structural elements made and used in a manner similar to that above described for the collapsible structure (1) defining a rectangular volume (37) and a triangular volume (62).

Now referring primarily to FIG. 32 through FIG. 38, an illustrative example of the collapsible structure (1) having a pair of longerons (11) can in the deployed condition (2) have a width (75A) of about fourteen inches and a height (75B) defined by the substantially tubular condition (16) of the pair longerons (11) and the diagonal cross members (41A). The pair of longerons (11) and diagonal cross members (41A) can be in a form as above described, and in the context of the illustrative example shown, provide the substantially tubular condition (16) of each of the pair of longerons (11) in the form of a semi-tubular structure (17) disposed about a longeron longitudinal axis (18) defining a curved surface (19) having a radius of about two inches, disposing a pair of longitudinal edges (20)(21) about 180 degrees apart. Understandably, embodiments can include all the permutations of configurations above described for collapsible support structures (1) having three or four longerons (11) as to the structure, orientation, and function of the structures.

Now referring primarily to FIG. 31B, and FIG. 39 through FIG. 43, the planate condition (3) of embodiments of the collapsible structure (1) can be achieved in whole or in part by disposing the longerons (11) between the root end (5) and the tip end (6) of the collapsible structure (1) in the planate condition (3). The planate condition (3) of the collapsible structure (1) can then be concentrically wound from the tip end (6) or from the root end (5) to achieve the rolled condition (4) whether about a spool (8) (as shown in the example of FIG. 16) or into a container (9) (similar to that above described and shown in FIG. 2A through FIG. 2C) or about a spool (8) rotatably coupled within a container (9) (as shown in the example of FIG. 2D).

Now referring primarily to FIG. 44A through FIG. 44C, and FIG. 45 through FIG. 50 (although the features described can be incorporated into embodiments of the invention including three, four, or more longerons (11)), particular embodiments of the invention can further include an amount of curvature between a longeron first end (12) and the longeron second end (13) of the longerons (11) (also referred to as the "arcuate condition" (77)). While FIG. 44A shows an embodiment in the arcuate condition (77) having an amount of curvature continuous between the longeron first end (12) and the longeron second end (13); other embodiments may have the curvature interrupted, or discontinuous between the longeron first end (12) and the longeron second end (13) such that the longeron (11) can have one or more segments in a linear condition (76) coupled to one or more segments in the arcuate condition (76), in accordance with a particular application.

Again referring primarily to FIG. 7 as applied to FIG. 44A through FIG. 44C, and FIG. 45 through FIG. 50, the laminate (14) utilized to produce arcuate condition (77) between the longeron first end (12) and the longeron second end (13) can provide a plurality of crossed fibers (32) resiliently disposed in the laminate (14) at an angle between 0 degrees and 90 degrees to a first laminate axis (33) such that a longeron flat condition (15) can be achieved as part of the planate condition (3) of the collapsible structure (1) (as shown in the example of FIG. 44B) in a first stable condition (35) which can be further disposed in the rolled condition (4) of the collapsible structure (1) (as shown in the Example FIG. 44C), and upon extension of the longeron (11) from the rolled condition (4), the plurality of crossed fibers (32) can return toward their original configuration to bias the laminate (14) toward the longeron tubulural condition (16) have segments in the linear condition (76) and segments in the arcuate condition (77) to provide a second stable condition (36) of the longeron (11) as part of the deployed condition (2) of the collapsible structure (1) (as shown in the examples of FIG. 1A and FIG. 2A).

Figure 50:
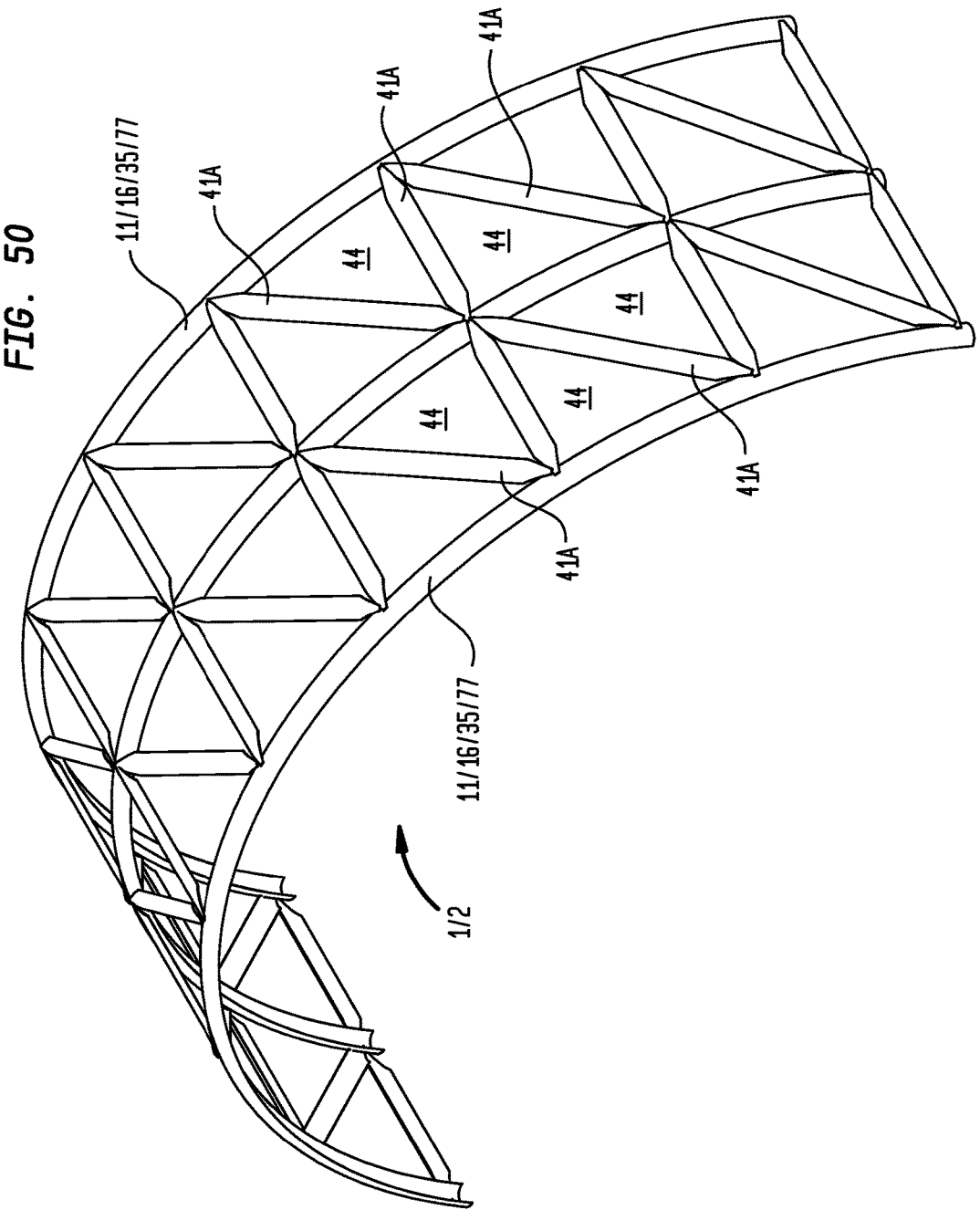
FIG. 50 is top perspective view of a particular embodiment of the collapsible structure having three longerons interconnected by a plurality of cross members which repeat the structural unit of the collapsible structure shown in FIGS. 32 through 38.

Now referring primarily to FIG. 50, particular embodiments the collapsible structure (1) can include a pair of longerons (11) having in generally the linear condition (76) in the deployed condition (2) (as shown in the example of FIG. 32) or in the arcuate condition (77) having an amount of curvature between the root end (5) and the tip end (6) of the collapsible structure (1) (as shown in the example of FIG. 40), the basic structural unit of the collapsible structure (1) can be repeated to extend the volume of the collapsible structure (1). As one illustrative example, FIG. 50 shows an embodiment of the collapsible structure (1) having three longerons (11) disposed substantially in adjacent spaced apart relation interconnected by a plurality of diagonal cross members (41A) which repeats the structural unit of the collapsible structure (1) shown in FIG. 32 through FIG. 38 and having an amount of curvature between the root end (5) and the tip end (6) of the collapsible structure (as shown in FIG. 44A through FIG. 44C, and FIG. 45 through FIG. 50) which can interconvert between the deployed condition (2) and the planate condition (3) and between the planate condition (3) and the rolled condition (4) as above described. This illustrative example, is not intended to be limiting, but rather is intended to be sufficient for one of ordinary skill in the art to make and use the various generic structural units shown in FIG. 1 through FIG. 49 disposed in repeated interconnected form to generate collapsible structures (1) for various applications.

Figure 51:
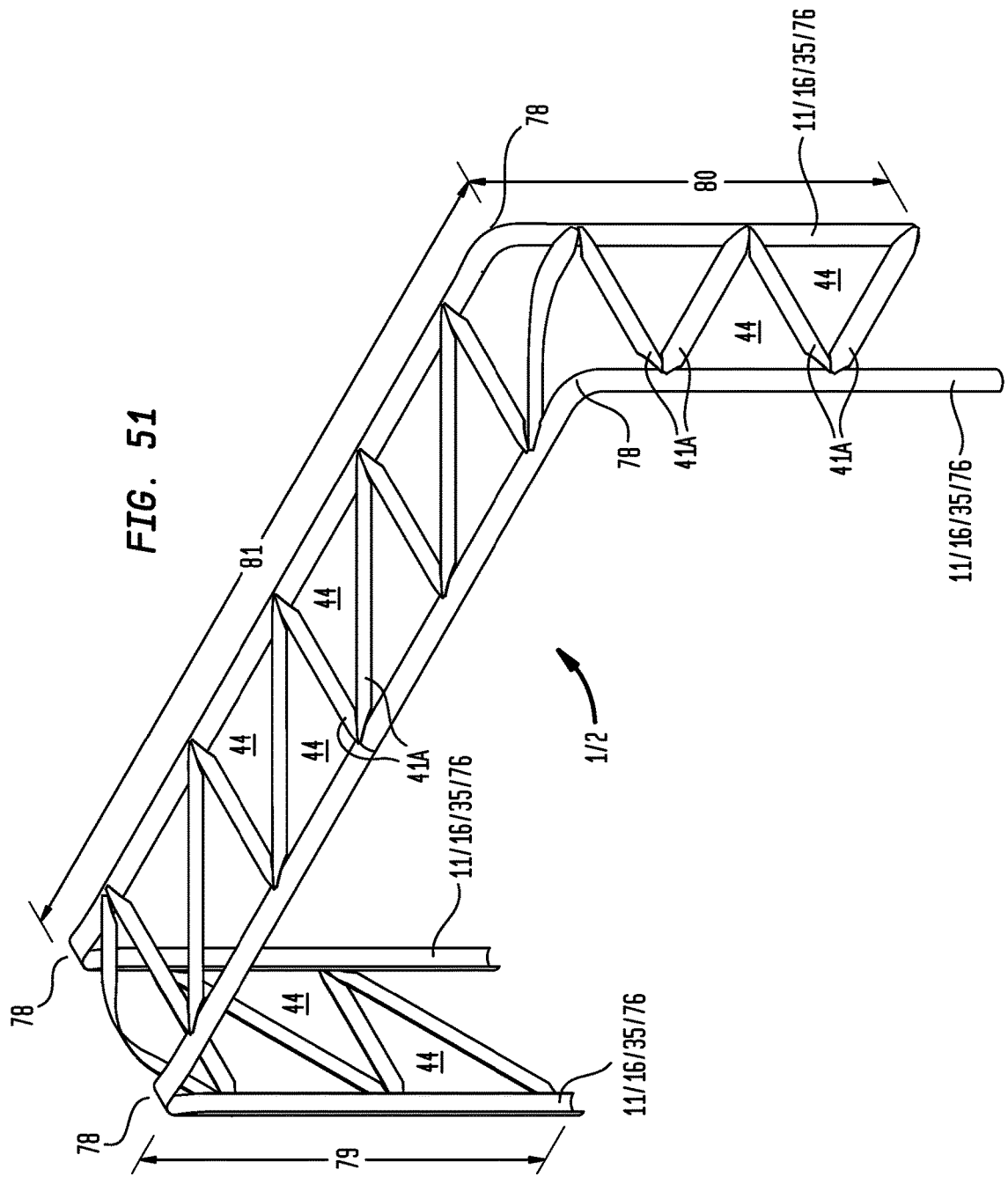
FIG. 51 is a perspective view of a particular embodiment of the collapsible structure shown in FIGS. 32 through 38 with the longerons in part disposed in the longeron flat condition and the longerons in part disposed in the longeron tubular condition.
Figure 52:
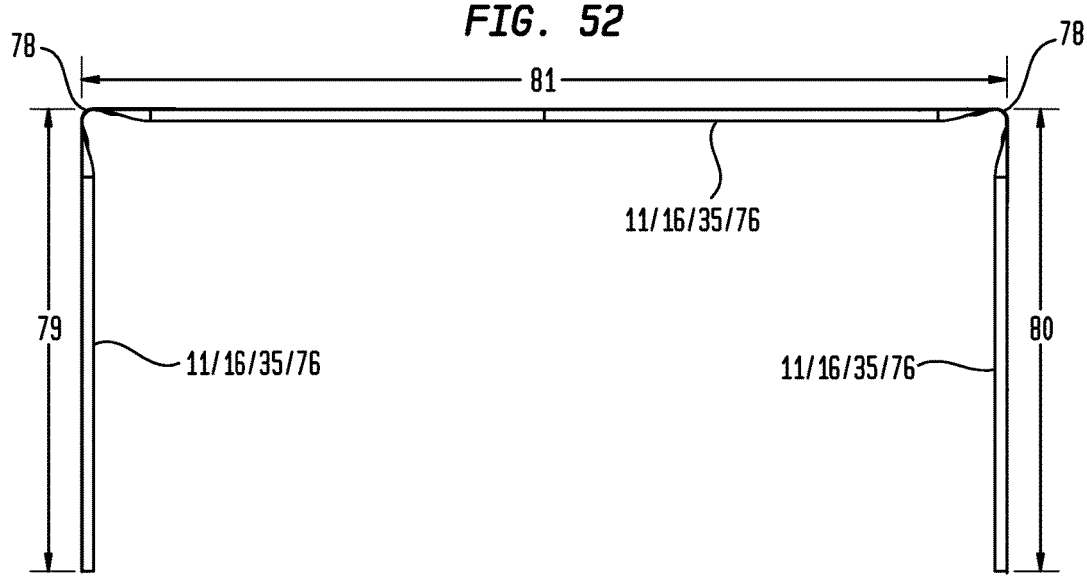
FIG. 52 is a side view of the particular embodiment of the collapsible structure shown in FIG. 51.
Figure 53:
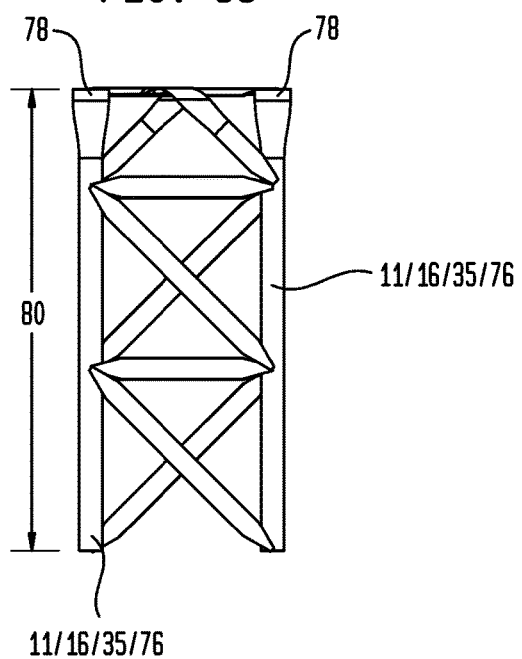
FIG. 53 is an end view of the particular embodiment of the collapsible structure shown in FIG. 51.

Now referring primarily to FIG. 51 through FIG. 53, as to particular embodiments of the collapsible structure (1), the longerons (11) interconnected by the plurality of diagonal cross members (41A) and vertical cross members (41B) can in part be disposed in the longeron flat condition (15) and cross member flat condition (46) and in part disposed in the longeron tubular condition (16) and cross member tubular condition (47) to allow variation in the basic structural units above-described (including those in which the longerons (11) are disposed in a generally linear condition (76) or disposed in a generally curved condition (77)). The part of the basic structural unit having the longerons (11) and the cross members (41) in the flat condition (15)(46) can in turn be disposed in arcuate bends (78) which allow the parts of the basic structural unit remaining in the tubular condition (16)(47) to be positioned in angled relation. As shown in the example of FIG. 51, a collapsible structure (1) having two longerons (11) interconnected by a plurality of diagonal cross members (41A) can include a arcuate bends (78) in the collapsible support structure (1) to dispose a pair of end portions (79)(80) of the collapsible structure (1) which retain the substantially tubular condition (16) in angled relation to a medial portion (81) of the collapsible structure (1). The illustrative examples of FIG. 51 through FIG. 53 are not intended to be limited to collapsible structures (1) having a pair of longerons (11), but rather are intended to be sufficient for a person of ordinary skill in the art to make and use planate arcuate elements (78) with the basic structural units above-described.

Embodiments of the inventive collapsible structure (1) having truss, or truss-like configurations, as above described, can have several advantages as compared to conventional split tube structures. First, embodiments of the inventive collapsible structure (1) having a substantially similar width in the planate condition (3), as compared to conventional slit tube structures in a flattened configuration, can provide substantially greater bending stiffness (resistance to deformation in response to force applied to the longitudinal axis) and rotational stiffness (rotation about an undeformed axis in response applied rotational force).

Figure 54:
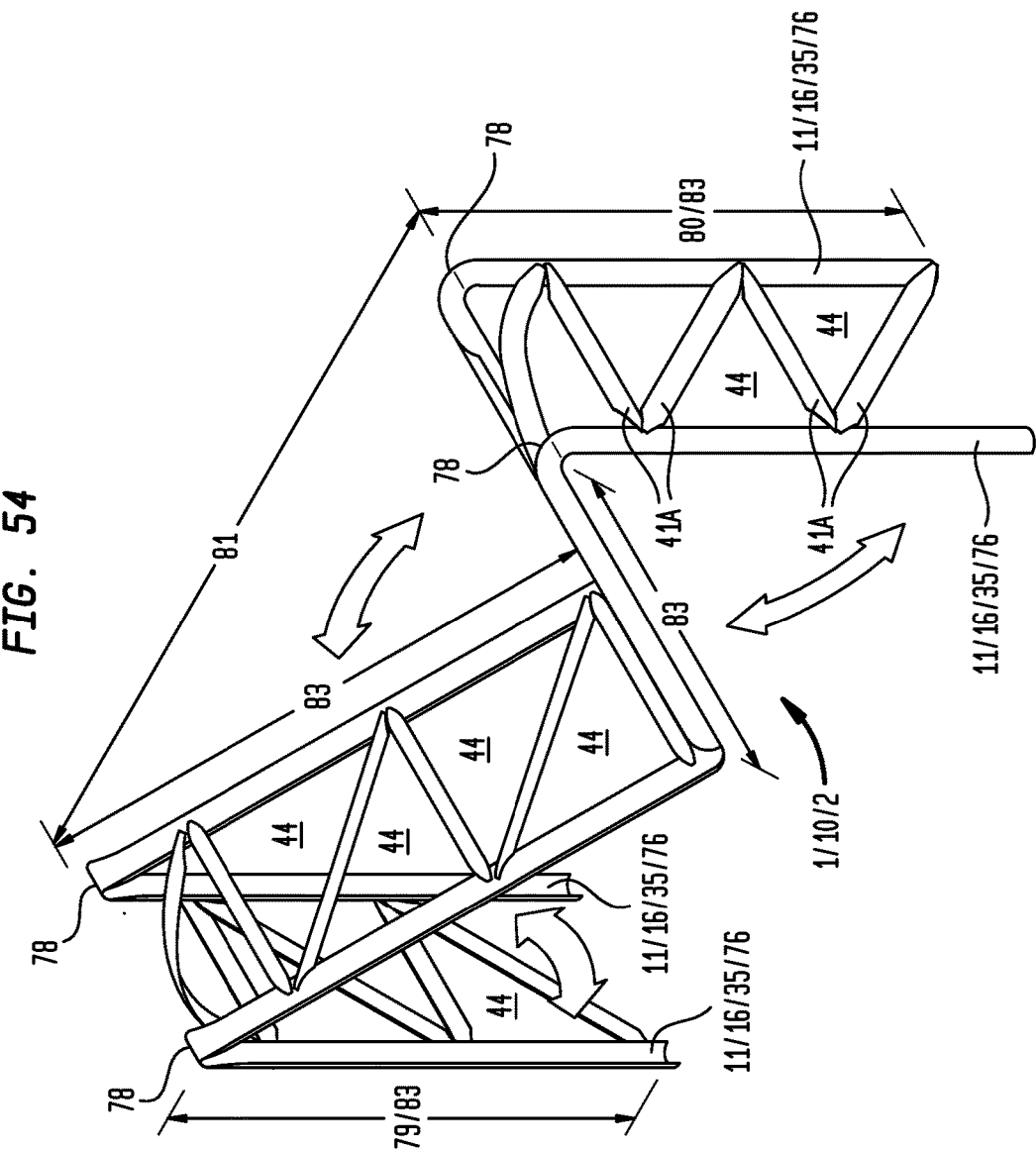
FIG. 54 is a perspective view of the particular embodiment of the collapsible structure shown in FIG. 52 including folds allowing the collapsible structure to interconvert between the deployed condition and a planate condition including a plurality of substantial planate layers.

Now referring primarily to FIG. 54, which illustrates an alternate method of generating the planate condition (3) of the embodiments of the collapsible structure (1) in which the longeron flat condition (15) and the cross member flat condition (46) can be achieved in a sufficient portion of the longeron length (11A) of one or more longerons (11) to allow the deployed condition (2) to fold in adjacent layers (83) in which the planate condition (3) of the entire collapsible structure (1) can be progressively achieved (also referred to as the "folded condition"). The folded condition can be achieved as a Z-fold or accordion fold or the like.

Figure 55:
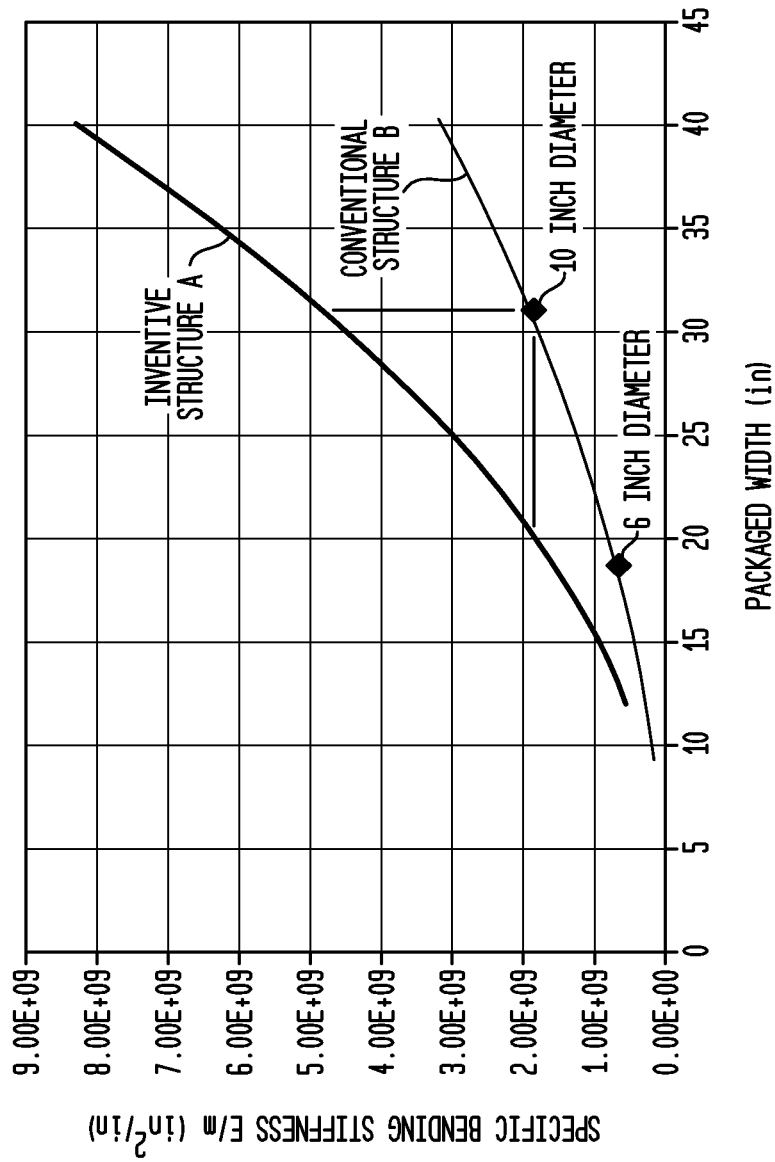
FIG. 55 is a plot of specific bending stiffness against width of the planate condition of the embodiment of the collapsible structure as shown in FIG. 3 as compared to a planate condition of a conventional slit tube structure.

Now referring to FIG. 55, which is a graph that plots bending stiffness of the inventive collapsible structure (1) having four longerons (11) having a rectangular volume (37) in the deployed condition (2) (shown in FIG. 55 as plot line A) as compared to conventional split tube structures (shown in FIG. 55 as plot line B) against collapsed width (82) of the inventive structure in the planate condition (3) and width of the conventional slit tube structure (also referred to as the "flattened configuration"). The same laminate (14) being utilized for both the longerons (11) of the inventive collapsible support structure (1) ("plot line A") and for the conventional slit tube structure ("plot line B").

FIG. 55 evidences that an embodiment of the inventive collapsible structure (1) as shown in the examples of FIG. 1 through FIG. 16 having a collapsed width (82) in the planate condition (3) ("plot line A") having substantially the same width as a ten inch diameter slit tube ("plot line B") in a flattened configuration can have about 2.5 times greater specific bending stiffness. Additionally, if the bending stiffness of the inventive collapsible structure (1) as shown in the examples of FIG. 1 through FIG. 16 ("plot line A") matches the bending stiffness of the conventional slit tube structure having a ten inch diameter ("plot line B"), then the inventive collapsible structure (1) ("plot line A") can have a collapsed width (82) in the planate condition (3) that can be as much as eleven inches narrower than that of the comparable split tube structure ("plot line B") in the flattened configuration. The plot further evidences that one inventive collapsible structure (1) in the deployed condition (2) ("plot line A"), as shown in the example of FIG. 1 through FIG. 16, can have greater bending stiffness than two conventional slit tube structures ("plot line B"), and in the planate condition (3) can have lesser collapsed width (82) by as much as thirty-two inches.

In large solar array applications the inventive collapsible structure (1) can provide several advantages as compared to conventional slit tube structures. Now referring primarily to FIG. 56 which shows an embodiment of the inventive collapsible structure (1) as shown in the example of FIG. 1 through FIG. 16 (shown in FIG. 56 as "Structure A") compared to a conventional slit tube structure (shown in FIG. 56 as "Structure B") when used as winglets in the context of a solar array having conventional photovoltaic blankets.

Comparison was made between embodiments of the inventive collapsible structure (1) ("Structure A") having a collapsed width (82) in the planate condition (3) substantially similar to the flattened configuration of a conventional ten inch diameter slit tube ("Structure B"). Substantially the same laminate (14) was used to make the longerons (11) of the inventive collapsible structure ("Structure A") and the slit tube elements ("Structure B"). The effects of photovoltaic blanket tension were included in a frequency analysis.

Now referring primarily to FIG. 56 which compares the first mode of the inventive collapsible support structure as shown in the examples of FIG. 1 through FIG. 16 ("Structure A") to the first mode of the conventional split tube structure ("Structure B"). The inventive collapsible support structure (1) ("Structure A") has greater bending stiffness as evidenced by first fundamental frequency of about 0.42 Hz which is about twice that of the conventional split tube structure ("Structure B") having a fundamental frequency of about 0.21 Hz. Additionally, the frequency for the inventive collapsible structure (1) ("Structure A") can be greater as the photovoltaic blanket tension increases and can be above 0.5 Hz with blanket tensions of over 500 lbs.

Now referring primarily to FIG. 57 which shows a comparison of buckling capacity with axial load between the inventive collapsible structure (1) (shown in the examples of FIG. 1 through FIG. 16 and identified as "Structure A" in the example of FIG. 57) and the conventional slit tube structure (shown in the example of FIG. 57 as "Structure B"). The analysis assumes a photovoltaic blank tension of one pound with an acceleration of free fall equal to 32 feet/sec/sec. The buckling load of the inventive collapsible structure (1) ("Structure A") was about 679 pounds of photovoltaic blanket tension as compared to about 619 pounds of photovoltaic blanket tension for the conventional slit tube structure ("Structure B"). A greater buckling load can be achieved in the inventive collapsible structure (1) ("Structure A") by the inclusion of local vertical cross members (41B) or a lesser spacing between diagonal cross members (41A). The overall Euler buckling mode can be substantially greater for the inventive collapsible structure (1) ("Structure A") as compared to conventional slit tube structure ("Structure B").

As to particular applications such as large solar arrays, a spool element (8) can be included as shown in the example of FIG. 2A through FIG. 2D. The longeron root end (5) of one or more longerons (1) of the collapsible structure (1) can be secured to the spool element (8) and the spool element (8) rotated to concentrically wind the collapsible structure (1) about the roll axis (4A) to extend or retract the tip end (6) of one or more longerons (1) of the collapsible structure (1). The spool (8) can be rotated directly by coupling the spool (8) to a motor or indirectly by engaging rollers to the external surface of the planate condition (3) which directionally rotate to extend or retract the tip end (6) of one or more longerons (1) of the collapsible support structure (1) and thereby correspondingly rotates the spool (8).

Again referring primarily to FIG. 2A through FIG. 2D, as to particular applications, a container (9) can be disposed in part or in whole about the rolled condition (4) of the collapsible structure (1) providing a container opening through which the planate condition (3) of the collapsible support structure (1) extends and retracts. Upon extension of the tip end (6) or the root end (5) from the rolled condition (4), the extended portion of the planate condition (3) moves toward the deployed condition (2) by action of forces stored in the planate condition (3), as above described.

As can be easily understood from the foregoing, the basic concepts of the present invention may be embodied in a variety of ways. The invention involves numerous and varied embodiments of a collapsible structure (1) and methods of making and using a collapsible structure (1) including the best mode. As above described, the embodiments of the collapsible structure (1) can be disposed in the planate condition (3) and then disposed in the rolled condition (4) in a forward sense or in a reverse sense or in a folded condition. This allows different laminate (14) structures and architectures to be utilized which in turn can be tuned to achieve selected target axial and radial stiffness, bending stiffness, torsional stiffness, longitudinal and latitudinal coefficients of thermal expansion, including, as to particular embodiments, zero coefficient of thermal expansion constructs for applications requiring precision configurations in the deployed condition (2). In addition, the longeron (11) cross section can be manipulated as well as overall longeron (11) structure, placement, and orientation to achieve fixed dimensional relations defining a numerous and wide variety of configurations in the deployed condition (2), planate condition (3), and rolled condition (4).

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of "laminate" should be understood to encompass disclosure of the act of "laminating"—whether explicitly discussed or not—and, conversely, were there effectively disclosure of the act of "laminating", such a disclosure should be understood to encompass disclosure of "a laminate" and even a "means for laminating." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

Moreover, for the purposes of the present invention, the term "a" or "an" entity refers to one or more of that entity; for example, "a laminate" refers to one or more layers of laminatable material. As such, the terms "a" or "an", "one or more" and "at least one" can be used interchangeably herein. Furthermore, an element "selected from the group consisting of" refers to one or more of the elements in the list that follows, including combinations of two or more of the elements.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Thus, the applicant(s) should be understood to claim at least: i) each of the collapsible support structures herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. A collapsible structure, comprising:
   four longerons each having a longeron length disposed between a longeron first end and a longeron second end, said four longerons each configurable along said longeron length between a longeron flat condition having opposed longeron external and internal flat surfaces disposed between a pair of longeron longitudinal edges and a longeron tubular condition having opposed longeron external and internal curved surfaces disposed between said pair of longeron longitudinal edges; and
   a plurality of cross members each having a cross member length disposed between a cross member first end and a cross member second end, said plurality of cross members each configurable along said cross member length between a cross member flat condition having opposed cross member external and internal flat surfaces disposed between a pair of cross member longitudinal edges and a cross member tubular condition having opposed cross member external and internal curved surfaces disposed between said pair of cross member longitudinal edges, said cross member first end and a cross member second end each correspondingly secured to a pair of said four longerons, said collapsible structure interconverts between a substantially planate condition disposing each of said four longerons and said plurality of cross members in said flat condition and a deployed condition disposing each of said four longerons in said longeron tubular condition and in a substantially fixed relation generally defining a rectangular volume.

2. The collapsible support of claim 1, wherein said plurality of cross members each configurable along said cross member length between a cross member flat condition having opposed cross member external and internal flat surfaces disposed between a pair of cross member longitudinal edges and a cross member tubular condition having opposed cross member external and internal curved surfaces disposed between said pair of cross member longitudinal edges.

3. The collapsible structure of claim 1, wherein each of said cross member first end and said cross member second end secure without articulation to a said longeron external surfaces of said four longerons.

4. The collapsible structure of claim 1, further comprising a rolled condition of said collapsible structure, said rolled condition including a plurality of concentric windings of said planate condition of said collapsible structure about a central roll axis.

5. The collapsible structure of claim 4, wherein said longeron internal curved surface in said flat condition faces toward said central axis of said rolled condition.

6. The collapsible structure of claim 4, wherein said longeron internal curved surface in said flat condition faces outward from said central axis of said rolled condition.

7. The collapsible structure of claim 4, further comprising a spool about which said planate condition of said collapsible structure concentrically winds to achieve said rolled condition.

8. The collapsible structure of claim 4, further comprising a container having an internal surface defining a chamber into which said planate condition retracts concentrically winding into said rolled condition inside of said chamber.

9. The collapsible structure of claim 8, further comprising a spool rotatably disposed inside of said chamber of said container, said collapsible structure coupled to said spool, whereby rotation of said spool concentrically winds said planate condition of said collapsible structure about said spool to dispose said rolled condition inside of said chamber.

10. The collapsible structure of claim 1, wherein said longeron internal curved surface disposed between said pair of longeron longitudinal edges of said longeron tubular condition defines a substantially circular arc of between about 90° to about 360°.

11. The collapsible structure of claim 10, wherein said pair of longeron longitudinal edges of said longeron tubular condition overlap to dispose a portion of said internal curved surface overlapping a portion of said external curved surface.

12. The collapsible structure of claim 10, wherein said four longerons each comprise a laminate containing a plurality of crossed fibers resiliently disposed in said longeron flat condition to bias said longeron toward returning to said longeron tubular condition.

13. The collapsible structure of claim 12, wherein said plurality of crossed fibers resiliently disposed in said longeron flat condition to bias said longeron toward returning to said longeron tubular condition, further comprises a plurality of crossed fibers resiliently disposed in said longeron tubular condition to bias said longeron tubular condition toward an arcuate condition between said longeron first end and said longeron second end.

14. The collapsible structure of claim 12, wherein said laminate containing said plurality of crossed fibers resiliently disposed in said longeron flat condition bias said collapsible structure in said planate condition toward returning to said deployed condition.

15. The collapsible structure of claim 12, said laminate containing said plurality of crossed fibers resiliently disposed in said longeron flat condition allow said collapsible structure in said planate condition to be concentrically wound into said rolled condition having a plurality of windings without generating radial forces or axial forces in said rolled condition sufficient to axially or radially move said plurality of windings.

16. The collapsible structure of claim 2, wherein said cross member internal curved surface disposed between said pair of cross member longitudinal edges of said longeron tubular condition defines a substantially circular arc of between about 45° to about 90°.

17. The collapsible structure of claim 16, wherein said plurality of cross member each include said laminate containing said plurality of crossed fibers resiliently disposed in said cross member flat condition to bias said cross member toward returning toward said cross member tubular condition.

18. The collapsible structure of claim 16, wherein said laminate containing said plurality of crossed fibers resiliently disposed in said cross member flat condition bias said collapsible structure in said planate condition toward returning to said deployed condition.

19. The collapsible structure of claim 1, wherein said collapsible structure in said deployed condition orients said longeron longitudinal edges of each of said four longerons in a substantially the same directional orientation.

20. The collapsible structure of claim 1, wherein said collapsible structure in said deployed condition orients said pair of longeron longitudinal edges of at least one of said four longeron in substantially different directional orientation.

21. The collapsible structure of claim 1, wherein said framework has a configuration in said deployed condition which in said planate condition locates each longeron in said flat condition in adjacent non-overlapping relation.

\* \* \* \* \*